United States Patent [19]

Fuji et al.

[11] Patent Number: 5,107,473
[45] Date of Patent: Apr. 21, 1992

[54] OPTICAL RECORDING/REPRODUCING DEVICE USING PERMISSIBLE RANGES FOR THE VALUE OF AN AUTOMATIC GAIN CONTROL VOLTAGE

[75] Inventors: Hiroshi Fuji; Toshihisa DeGuchi, both of Nara, Japan

[73] Assignee: Sharp Kabushiki Kaisha, Osaka, Japan

[21] Appl. No.: 594,275

[22] Filed: Oct. 9, 1990

[30] Foreign Application Priority Data

Oct. 11, 1989 [JP] Japan ................................. 1-265987

[51] Int. Cl.$^5$ ................................................ G11B 7/00
[52] U.S. Cl. .......................................... 369/32; 369/58; 369/44.29; 369/124; 369/48
[58] Field of Search ...................... 369/54, 48, 124, 13, 369/32, 47, 58, 44.29

[56] References Cited

U.S. PATENT DOCUMENTS

| | | | |
|---|---|---|---|
| 4,580,255 | 4/1986 | Inane et al. | 369/48 |
| 4,924,447 | 5/1990 | Fuji et al. | |
| 5,026,981 | 6/1991 | Yamane et al. | 369/54 |

FOREIGN PATENT DOCUMENTS 62-184629  4/1987  Japan .

Primary Examiner—Robert L. Richardson
Assistant Examiner—Nabil Hindi
Attorney, Agent, or Firm—David G. Conlin; Robert F. O'Connell

[57] ABSTRACT

The optical recording/reproducing device of the present invention has an AGC circuit that emits an AGC voltage to be used for controlling the amplification of a reproduced signal in accordance with the amplitude of the reproduced signal, and a controller where permissible ranges for the AGC voltage value is set for recording operation, for erasing operation and for reproduction operation, that, when an optical recording medium is loaded and when one of the recording operation, erasing operation or reproduction operation is instructed, compares the AGC voltage with the permissible range corresponding to the instructed operation and determines whether the AGC voltage is comprised within the permissible range for the instructed operation, and that sets the conditions for the instructed operation for each optical recording medium being loaded in the device. Reproduction/recording/erasing operations may be thus accurately executed in accordance with the characteristics of the recording medium being loaded in the device.

11 Claims, 29 Drawing Sheets (a) SECTOR FORMAT (b) HIGH-FREQUENCY SUPERPOSITION SWITCH SIGNAL 1812

(c) MODULATED DATA 1310

(d) LIGHT INTENSITY LEVEL 1910

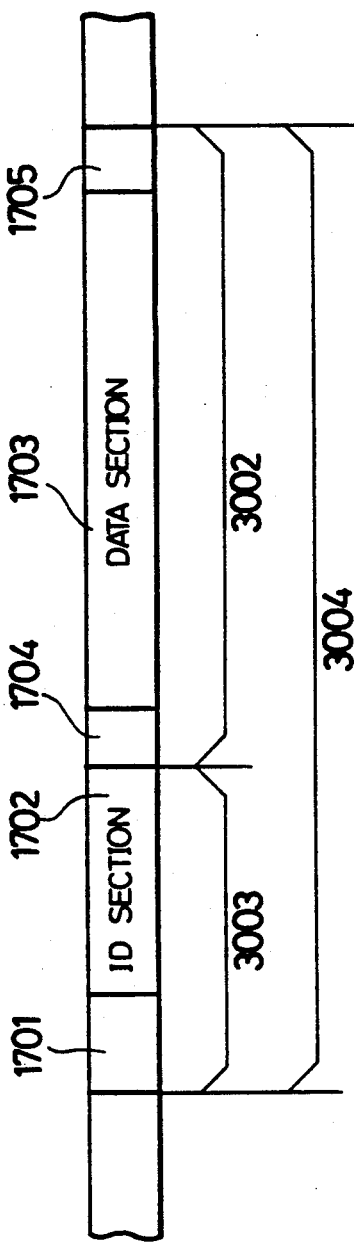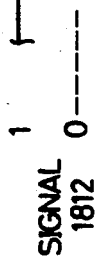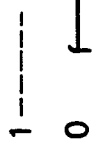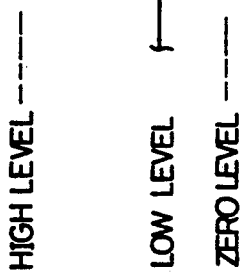
FIG. 18

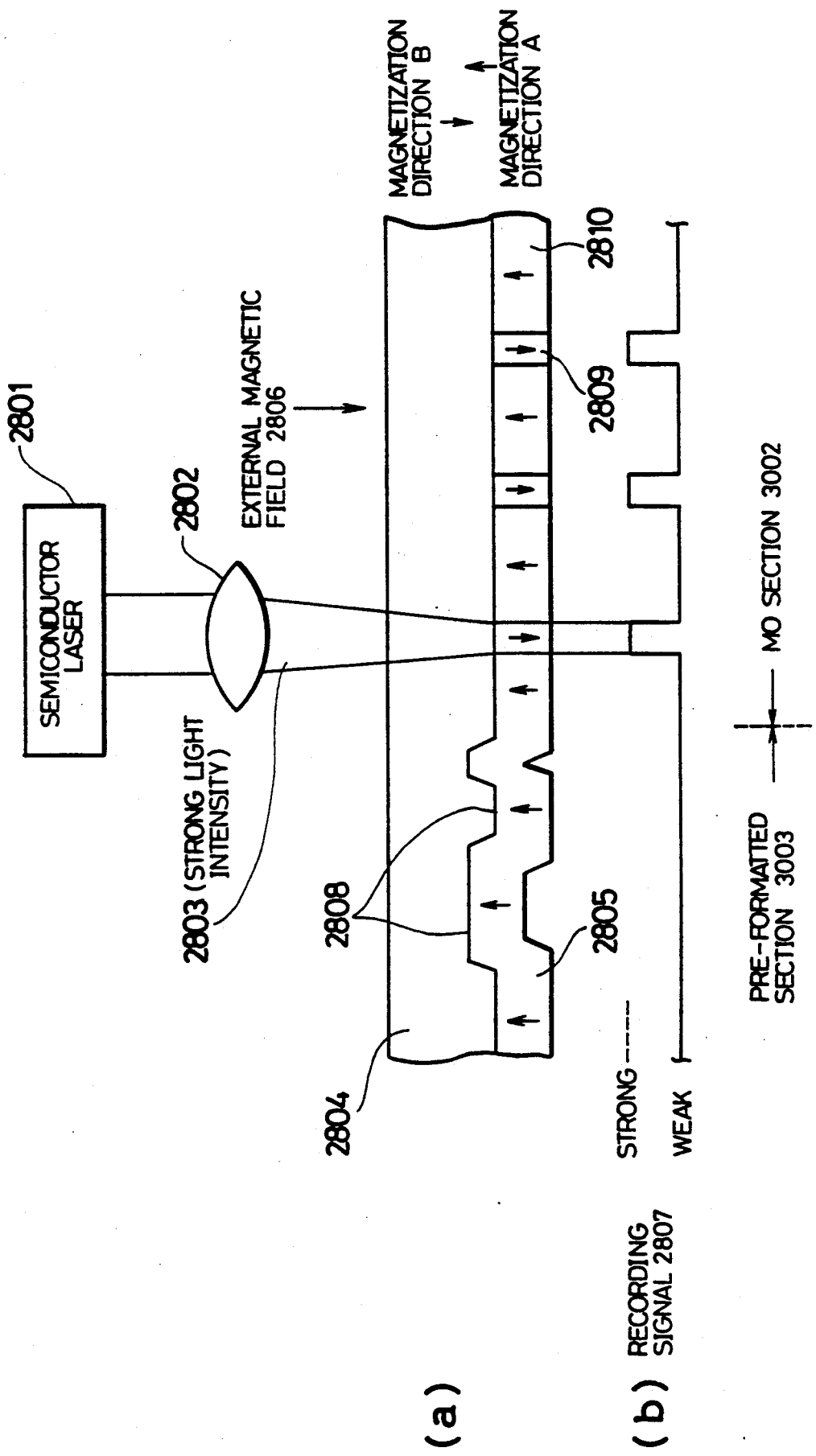

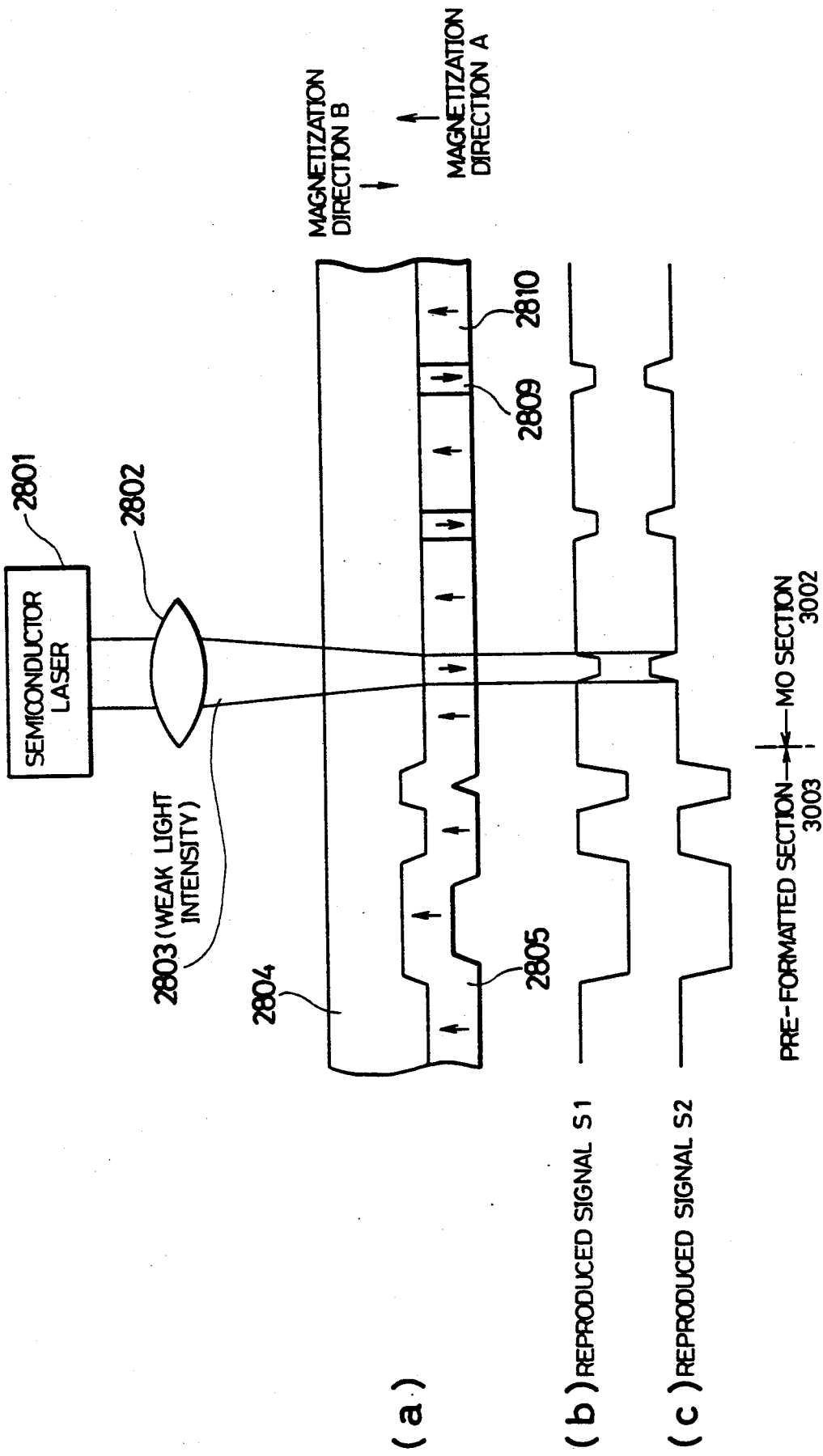

OPTICAL RECORDING/REPRODUCING DEVICE USING PERMISSIBLE RANGES FOR THE VALUE OF AN AUTOMATIC GAIN CONTROL VOLTAGE

FIELD OF THE INVENTION

The present invention relates to an optical recording-/reproducing device that is capable of determining whether the optical recording medium being employed can be read, and that permits to prevent improper recording or erasing operations to be performed on a recording medium whose characteristics do not conform to the recording/reproducing device.

BACKGROUND OF THE INVENTION

A conventional optical recording/reproducing device, here a magneto-optical memory device, will be described hereinbelow. A magneto-optical disk device has been chosen as a concrete example for the magneto-optical memory device. This magneto-optical disk device uses a magneto-optical disk as optical recording medium and is capable of recording, reading and erasing information on the magneto-optical disk. The following description will be covered with reference to FIGS. 26 to 33.

First, operations for recording information on the magneto-optical disk and for erasing information recorded on the magneto-optical disk will be discussed with reference to FIG. 26.

As illustrated in FIG. 26(a), a typical magneto-optical disk is constituted of disk substrate 2804 and a recording magnetic film 2805 formed on the disk substrate 2804. The recording magnetic film 2805 is formed such that its axis of easy magnetization is perpendicular to the film surface thereof, and is initialized such that the direction of magnetization indicated by an arrow A or an arrow B within the film shown in FIG. 26(a) is preliminary set in a fixed direction (for example, shown by the arrow A in FIG. 26(a)).

During recording, a laser beam 2803 is projected from a semiconductor laser 2801, converged by an objective lens 2802 so as to have a diameter of approximately 1 μm and is irradiated on the recording magnetic film 2805. At this time, the intensity of the laser beam 2803 is controlled according to a recording signal 2807 (see FIG. 26(b)) corresponding to the information to be recorded. When the recording signal 2807 is in the high level and thereby the intensity of the laser beam 2803 is strong, the temperature of the area illuminated by the strong laser beam 2803 rises locally, goes above the Curie point, and the coercive force of the area illuminated significantly lowers. As a result, the direction of magnetization A in the area where the coercive force lowered is inverted and frozen in the same direction of magnetization B as that of an external magnetic field 2806 that was applied preliminary, thereby permitting information corresponding to the recording signal 2807 to be recorded on the recording magnetic film 2805. Hereinafter, parts where high level recording signals 2807 were recorded as described above and where the direction of magnetization is B will be referred to as marks 2809, and parts where low level recording signals 2807 were recorded and where the direction of magnetization is A will be referred as non-marks 2810. In other words, the marks 2809 correspond to, for instance, the binary codes "1" composing the information, while the non-marks 2810 correspond to the binary codes "0". Hereinafter, the method of recording information as described above will be referred to as magneto-optical recording.

Information recorded on the recording magnetic film 2805 is erased by inverting the direction of the external magnetic field 2806 and following a method similar to the one used for recording. The direction of magnetization is restored to its original direction of initialization, i.e. the direction of magnetization A in FIG. 26(a), and the recorded information is erased. Marks 2809 thus become non-existent in the erased part.

In the present example, the light modulation method is adopted, i.e. recording is executed by modulating the intensity of the laser beam 2803 in accordance with the recording signal 2807, while applying an external magnetic field 2806 of a constant intensity. However, the magnetic modulation method may as well be adopted and recording can be executed by making the intensity of the laser beam 2803 constant and modulating the direction of the external magnetic field 2806 in accordance with the recording signal 2807.

The disk substrate 2804 mentioned earlier is made of glass, plastic or other material, and lands and pits 2808 are preliminary etched thereon, as shown in FIG. 26(a). The lands and pits 2808 represent address information indicating the addresses of tracks and sectors. The above address information is preliminary etched onto the disk substrate 2804 during the manufacturing stage of the magneto-optical disk according to a fixed format. Hence, the lands and pits 2808 cannot be recorded or erased thereafter. Hereinafter, parts where a plurality of lands and pits 2808 are formed in a group will be referred to as pre-formatted sections 3003. Information is recorded and erased in areas other than the pre-formatted sections 3003. Hereinafter these areas will be referred to as MO (magneto-optical) sections 3002. Pre-formatted sections 3003 and MO sections 3002 are usually accommodated alternately to form a track 3005 in a spiral shape or in the shape of concentric circles, as illustrated in FIG. 28. A sector 3004 is constituted by a pair composed of a pre-formatted section 3003 and a MO section 3002. In addition, a magneto-optical disk 3001 comprises a plurality of sectors 3004 formed on the track 3005, each sector 3004 being provided with address information. Information is recorded, reproduced and erased sector 3004 by sector 3004.

As illustrated in FIG. 29, the pre-formatted sections 3003 of the track 3005 are arranged such that either the land or the pit that compose one land and pit 2808 shown in FIG. 26(a) forms a mark 2811, and such that the other component of the land and pit 2808 forms a non-mark 2812. Marks 2809 and non-marks 2810 are recorded in the MO section 3002 through magneto-optical recording as described earlier.

A reproduction operation performed on the magneto-optical disk 3001 will be discussed hereinbelow with reference to FIG. 27.

As illustrated in FIG. 27(a), the laser beam 2803 is projected from the semiconductor laser 2801, is converged by the objective lens 2802 so as to have a diameter of approximately 1 μm and is irradiated upon the recording magnetic film 2805. Here, the intensity of the laser beam 2803 is weaker when information is reproduced than when information is recorded or erased. The laser beam 2803 is a linearly polarized light and its plane of polarization is rotated as the laser beam 2803 passes through or is reflected by the recording magnetic film 2805 due to the Faraday effect or the Kerr effect.

The plane of polarization of the laser beam 2803 is rotated in mutually opposite directions depending on whether the laser beam 2803 is irradiated on a mark 2809 or a non-mark 2810. Reproduction of recorded information is performed by detecting the difference in polarization direction. Accordingly, two types of reproduced signals S1 and S2, shown by (b) and (c) in FIG. 27, are generated.

The reproduction optical system employed for producing the reproduced signals S1 and S2 will be discussed briefly hereinbelow. As illustrated in FIG. 30, a reflected light 3201 coming from the magneto-optical disk 3001 is directed toward a PBS (analyzer) 3202 where it is split according to its polarization direction through the Kerr effect. Two detected lights 3210 and 3211 that were separated in the PBS 3202 are respectively directed toward photodetectors 3203 and 3204 where they are converted into electric signals that vary according to the respective intensities of the detected lights 3210 and 3211, and released as reproduced signals S1 and S2. As it will be covered in details later, the signals corresponding the pre-formatted section 3003 and the signals corresponding to the MO section 3002 can be obtained separately by determining the sum and the difference of the reproduced signals S1 and S2. In addition, the marks 2809 and the non-marks 2810 may be reproduced separately through the signals corresponding to the MO section 3002 thereby enabling the information recorded on the recording magnetic film 2805 to be reproduced.

The polarity of the reproduced signals S1 and S2 will be described with reference to FIG. 31.

Suppose that $\alpha$ represents the vector of a reflected light from a non-mark 2810 (direction of magnetization A) of the MO section 3002, and $\beta$ represents the vector of a reflected light from a mark 2809 (direction of magnetization B) of the MO section 3002. The reflected light vectors $\alpha$ and $\beta$ are rotated in opposite directions by an angle corresponding to the rotation angle of their respective plane of polarization. The X direction components and Y direction components of the reflected light vectors $\alpha$ and $\beta$ are detected in the PBS 3202 that transmits light having a X or Y polarization direction. These two polarization directions X and Y form a right angle. Geometrical explanation will be made hereinbelow. The reflected light vector $\alpha$ is projected in the polarization direction X and the polarization direction Y thereby producing detected light vectors $\alpha_x$ and $\alpha_y$. Similarly, the reflected light vector $\beta$ is projected in the polarization direction X and the polarization direction Y thereby producing detected light vectors $\beta_x$ and $\beta_y$. The magnitudes of detected light vectors $\alpha_x$ and $\beta_x$ correspond to the reproduced signal S1 and the magnitudes of the detected light vectors $\alpha_y$ and $\beta_y$ corresponds to the reproduced signal S2. Further, the detected light vectors $\alpha_x$ and $\beta_x$ correspond to the detected light 3210 shown in FIG. 30, and the detected light vectors $\alpha_y$ and $\beta_y$ correspond to the detected light 3211.

Suppose that, as illustrated in FIG. 31, the high level of the reproduced signal S1 corresponds to a non-mark 2810 and the low level of the reproduced signal S1 corresponds to a mark 2809. Here, the high level of the reproduced signal S2 corresponds to a mark 2809 and its low level to a non-mark 2810. The polarity of the reproduced signal S1 and the polarity of the reproduced signal S2 are thus opposite. The reproduced signals S1 and S2 are then fed into a differential amplifier where the difference of the reproduced signals S1 and S2 is determined and the reproduced signals S1 and S2 are amplified and thereby their S/N is improved, and information is reproduced.

The polarity of the reproduced signals S1 and S2 obtained when the pits and lands 2808 physically etched in the pre-formatted sections 3003 are reproduced, will be described hereinbelow with reference to FIG. 32. As there is no recording nor erasing operation taking place in the pre-formatted sections 3003, the direction of magnetization therein coincides with the direction A only. When the laser beam 2803 is irradiated on a pre-formatted section 3003, the shape of the marks 2811 and non-marks 2812, i.e. the lands and pits 2808, causes the laser beam 2803 to be diffracted. As a result, a long reflected light vector $\delta$ (when, for example, a non-mark 2812 is read) or a short reflected light vector $\epsilon$ (when, for example, a mark 2811 is read) is produced in accordance with the lands and pits 2808, as illustrated in FIG. 32. A detected light vector $\delta_x$ and a detected light vector $\delta_y$ are produced by projecting the reflected light vector $\delta$ in the polarization direction X and in the polarization direction Y of the PBS 3202. Similarly, a detected light vector $\epsilon_x$ and a detected light vector $\epsilon_y$ are produced by project the reflected light vector $\epsilon$ in the polarization direction X and in the polarization direction Y of the PBS 3202. The magnitudes of the detected light vector $\delta_x$ and of the detected light vector $\epsilon_x$ correspond to the reproduced signal S1, and the magnitudes of the detected light vector $\delta_y$ and of the detected light vector $\epsilon_y$ correspond to the reproduced signal S2. The high level of the reproduced signal S1 and the high level of the reproduced signal S2 both correspond to a non-mark 2812 of the lands and pits 2808, while the low level of the reproduced signal S1 and the low level of reproduced signal S2 correspond to a mark 2811. Consequently, as illustrated in FIGS. 27(b) and (c), the reproduced signals S1 and S2 have the same polarity for the pre-formatted section 3003 while they have mutually inverted polarities for the MO section 3002.

The reproduction circuit of the magneto-optical disk device will be described with reference to FIG. 33.

In FIG. 33, the reproduced signals S1 and S2 are fed into a reproduction circuit 3501 where a binary output signal 3510 is derived from the reproduced signals S1 and S2. The output signal 3510 is sent to an address generating circuit 3502 and to a timing generating circuit 3503. In the address generating circuit 3502, the address information contained in the pre-formatted section 3003 of each sector 3004 shown in FIG. 28, is read from the output signal 3510 enabling an address signal 3511 to be generated and released. In the timing generating circuit 3503, a sector mark used for the synchronization of the sectors and also contained in the pre-formatted section 3003, is detected enabling a recording/reproducing/erasing reference timing signal 3512 to be generated and released. Provision is made such that the magneto-optical disk device records, reads or erases information in the sector 3004 of the desired address based on the address signal 3511 and the recording/reproducing/erasing reference timing signal 3512.

However, the arrangement conventionally adopted suffers from the following drawbacks. Namely, when the magneto-optical disk whereon information was recorded through magneto-optical recording is to be used with a different device, or when magneto-optical disks having different characteristics (for example different reflectances, different transmittances, etc.) are used, the recording/reproducing conditions vary, sometimes causing the reproduction to be infeasible. In addition, when information is being read from a magneto-optical disk, the projection of a laser beam having an inadequate light intensity might erase the information recorded on the magneto-optical disk, or even lead to the destruction of the magneto-optical disk itself. An optical recording/reproducing device having a higher reliability was thus necessary.

SUMMARY OF THE INVENTION

An object of the present invention is to provide an optical recording/reproducing device capable of detecting characteristics, such as the reflectance, etc. of an optical recording medium, and of determining whether information can be read, recorded or erased on this optical recording medium.

Another object of the present invention is to provide an optical recording/reproducing device capable of adjusting the operating conditions for reproducing, recording or erasing, in accordance with the characteristics of the optical recording medium and based on the result of the above detection.

In order to achieve the above objects, an optical recording/reproducing device in accordance with the present invention is characterized in comprising AGC voltage generating means for emitting an AGC voltage to be used for controlling the amplification of a reproduced signal in response to the amplitude of the reproduced signal, and control means for preliminary setting permissible ranges for the AGC voltage value for recording operation, for erasing operation and for reproducing operation; for comparing the AGC voltage emitted by the AGC voltage generating means with the permissible range corresponding to the instructed operation when an optical recording medium is loaded in the device and when one of the recording operation, erasing operation and reproduction operation is instructed; and for setting the conditions of the instructed operation for each optical recording medium.

With the above arrangement, an AGC circuit already installed in the reproduction circuit of a conventional optical recording/reproducing device, may serve as AGC voltage generating means. Therefore, there is no need of implementing a separate circuit, and in addition the characteristics of the optical recording medium being loaded can be determined before the reproduction of information takes place. Namely, the AGC voltage released by the AGC circuit does not represent directly the amplitude of the reproduced signal but is a nondecreasing function or a nonincreasing function of the amplitude of the reproduced signal. In addition, the amplitude of the reproduced signal is a nondecreasing function or a nonincreasing function of the characteristics such as the reflectance, etc. of the optical recording medium being loaded. Consequently, the AGC voltage is also a nondecreasing function or a nonincreasing function of the characteristics of the optical recording medium being loaded. Therefore, as the control means determines whether the AGC voltage obtained when an optical recording medium is loaded in the device, is comprised within the permissible range preliminary set for the instructed operation, i.e. the recording, reproducing or erasing operation, a laser beam of an inadequate light intensity can be prevented from being projected on the optical recording medium. When, for example, the AGC voltage falls within the range permitting the instructed recording, erasing or reproduction operation to be performed, the optical recording/reproducing device executes the operations necessary for recording, reading or erasing information on the optical recording medium. On the other hand, when the AGC voltage does not fall within the permissible range, provision is made such that the optical recording medium is ejected and such that an alarm display output signal is generated. Such an arrangement permits to improve the reliability of the optical recording/reproducing device. The reliability of the optical recording/reproducing device can be even more enhanced by making additional provision such that the operating conditions such as for instance the light intensity of the laser beam, etc. during reproduction, or the light intensity of the laser beam, etc. during recording or erasing, are set for each optical recording medium loaded in the optical recording/reproducing device in response to the value of the AGC voltage.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram illustrating essential parts of a controller of a magneto-optical disk device in accordance with the present invention.

FIG. 2 is a block diagram illustrating the configuration of essential parts of a MO waveform processing section comprised in a reproduction circuit.

FIG. 3 is a circuit diagram illustrating one example of the configuration of an AGC amplifier.

FIG. 4 is a graph illustrating the relation between an AGC voltage supplied to a voltage controlled amplifier and the amplification degree of the voltage controlled amplifier.

FIG. 5 is a graph illustrating the relation between the AGC voltage and the peak-to-peak value of a MO data signal.

FIG. 6 is a circuit diagram illustrating another example of the configuration of the AGC amplifier.

FIG. 7 is a circuit diagram illustrating an example of the configuration of a circuit for reducing a discharge time constant of an AGC voltage generating circuit.

FIG. 8 is a graph illustrating the relation between the reflectance of a magneto-optical disk, the AGC voltage and the amplitude of the MO data signal.

FIG. 9 is a circuit diagram illustrating an example of the configuration, of an envelope detection circuit.

FIG. 10 to FIG. 25 are explanatory views illustrating the configuration of a magneto-optical disk device in accordance with the present invention.

FIG. 10 is an explanatory view illustrating schematically the overall configuration of the magneto-optical device of the present invention.

FIG. 11 is a block diagram illustrating the configuration of a recording circuit.

FIG. 12 is a block diagram illustrating the configuration of a reproduction circuit.

FIG. 13 is a block diagram illustrating the configuration or essential parts of the controller.

FIG. 14 is an explanatory view illustrating a 2-7 modulation method chosen as an example of method of modulating recorded information.

FIG. 15 is an explanatory view illustrating an example of format adopted for a sector that serves as unit for recording information on the magneto-optical disk.

FIG. 16 is a block diagram illustrating the configuration of a semiconductor laser driving circuit.

FIG. 17 is an explanatory view illustrating the change-over of a high-frequency superposition switch signal and other signals in accordance with a sector format, during recording/erasing.

FIG. 18 is an explanatory view illustrating the level of the high-frequency superposition switch signal and other signals in accordance with the sector format, during reproduction.

FIG. 19 is a block diagram illustrating the configuration of a timing generating circuit.

FIG. 20 is a block diagram illustrating the configuration of a sector mark detection circuit.

FIG. 21 is an explanatory view illustrating the detection process of a sector mark.

FIG. 22, consisting of (a)–(h), is an explanatory view illustrating the waveforms of signals generated in different sections of the timing generating circuit.

FIG. 23 is a block diagram illustrating the configuration of a signal processing circuit.

FIG. 24, consisting of (a)–(g), is an explanatory view illustrating the waveforms of signals generated in the different sections of the signal processing circuit.

FIG. 25, consisting of (a)–(e), is an explanatory view intended to illustrate FIG. 24 in more details and illustrating the process followed for generating digital reproduced data derived from marks of a MO section and a pre-formatted section.

FIG. 26 to FIG. 33 illustrate a conventional example.

FIG. 26, consisting of (a) and (b), is an explanatory view illustrating a recording operation executed by a magneto-optical disk device on a magneto-optical disk.

FIG. 27 is an explanatory view illustrating a reproduction operation executed by the magneto-optical disk device on, the magneto-optical disk.

FIG. 28 is a schematic explanatory view illustrating the configuration of a sector formed on the magneto-optical disk.

FIG. 29 is an enlarged view of essential parts shown in FIG. 28.

FIG. 30 is a block diagram illustrating the configuration of essential parts of an optical system for reproduction.

FIG. 31 is an explanatory view illustrating the relation between the polarities of two signals reproduced from a MO section of the magneto-optical disk.

FIG. 32 is an explanatory view illustrating the relation between the polarities of two signals reproduced from a pre-formatted section of the magneto-optical disk.

FIG. 33 is a block diagram illustrating essential parts of the system adopted for reproducing information from a pre-formatted section of the magneto-optical disk.

DESCRIPTION OF THE EMBODIMENTS

Figure 1:
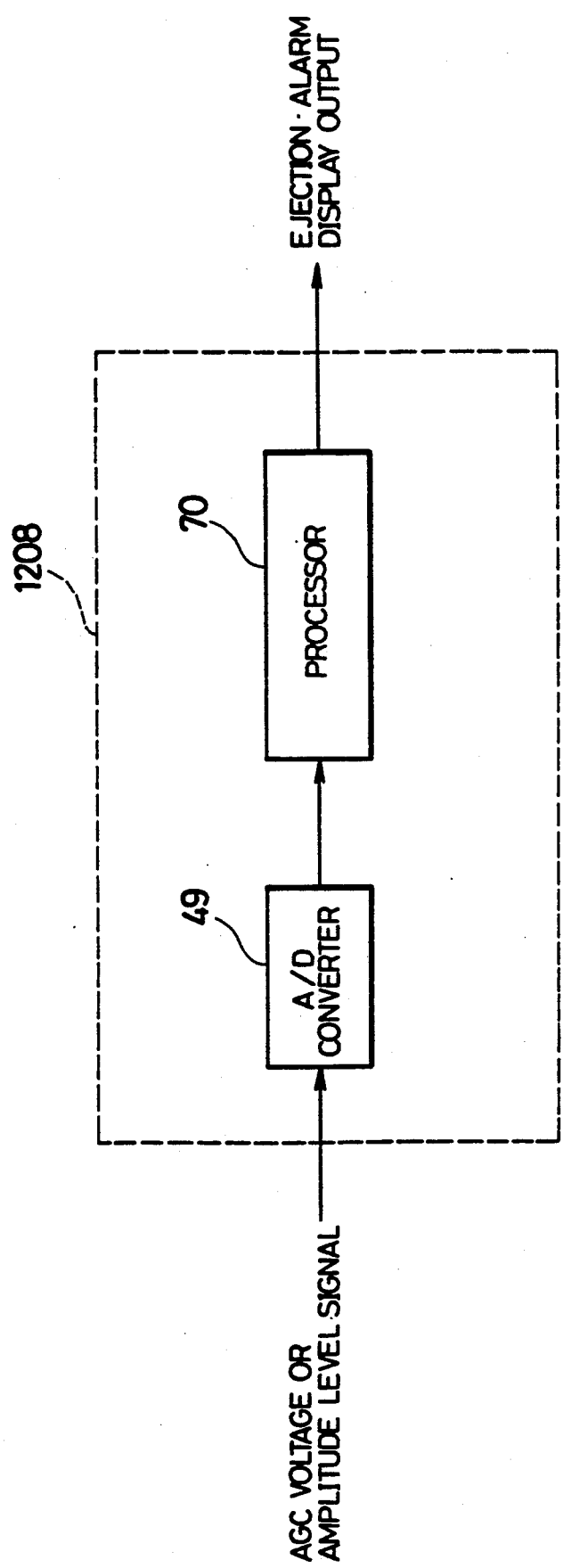
FIG. 1 to FIG. 9 illustrate an embodiment of the present invention.

A first embodiment of the present invention will be described hereinbelow with reference to FIGS. 1 to 25.

Here, a magneto-optical disk device capable of recording, erasing and reproducing information on a magneto-optical disk will be discussed as an example of optical recording/reproducing device.

1. Outline of the Configuration

First, essential parts of the magneto-optical disk device will be described with reference to FIG. 10.

Information is recorded/reproduced/erased on/from a magneto-optical disk 1201 used as optical recording medium as follows. A laser beam 1204 is projected from an optical head 1203 and irradiated on the magneto-optical disk 1201 while the magneto-optical disk 1201 is driven to rotate by a spindle motor 1202. In addition, when information is to be recorded or erased, an external magnetic field is applied from an external magnetic field applying magnet 1205 simultaneously with the projection of the laser beam 1204 on the magneto-optical disk 1201. If the external magnetic field applying magnet 1205 is constituted by a permanent magnet, when recording and erasing information, the orientation of the magnetic field can be inverted by having a motor, not shown, rotate the external magnetic field applying magnet 1205 by a half turn. Besides, when the external magnetic field applying magnet 1205 is composed of an electromagnet, and the orientation of the external magnetic field may be inverted by making provision such that the electric current is supplied to the external magnetic field applying magnet 1205 in inverted directions when information is recorded and when information is erased.

During recording, a semiconductor laser driving current 1210 is supplied from a recording circuit 1206 to a semiconductor laser 2801 (see FIG. 16) housed within the optical head 1203. The light intensity of the semiconductor laser 2801 is suitably controlled through the semiconductor laser driving current 1210.

During reproduction, reproduced signals 1211 are released from the optical head 1203 and fed into a reproduction circuit 1207. As was described earlier with reference to (b) and (c) of FIG. 27, the reproduced signals 1211 are composed of two types of reproduced signals S1 and S2. Reproduced data 1212 that was reproduced in the reproduction circuit 1207 is sent to a controller 1208.

Based on the reproduced data 1212, the timing control of various control signals 1213 is executed in the controller 1208. The control signals 1213 are then fed into the recording circuit 1206 and the reproduction circuit 1207. In addition, a magnetic field control signal 1214 is transmitted from the controller 1208 to the external magnetic field applying magnet 1205 thereby enabling the orientation of the external magnetic field to be controlled.

1.1 Sector Format

The configuration of a sector 3004 that forms the unit per which information is recorded/reproduced on the magneto-optical disk 1201, will be described with reference to FIG. 15. A sector 3004 is composed of a pre-formatted section 3003 and a MO section 3002. Further, the pre-formatted section 3003 is formed by a sector mark section 1701 indicating the head end of each sector 3004 and where a sector mark needed for generating a synchronizing signal based on each sector 3004 is recorded, and an ID section 1702 comprising address information of the sector 3004. As it was described earlier with reference to FIG. 26(a), lands and pits 2808 are etched in the sections 1701 and 1702. A land and pit 2808 is composed of a mark 2811 and a non-mark 2812, and cannot be overwritten and/or erased. On the other hand, the MO section 3002 that represents the data section, is composed of a data section 1703 as data area where information is recorded/reproduced/erased, and a pair of gap sections 1704 and 1705 positioned in front of and behind the data section 1703. As it was described earlier with reference to FIG. 26(a), marks 2809 and non-marks 2810 corresponding to modulated data 1310, are recorded in the data section 1703. The gap sections 1704 and 1705, are margin areas provided between the pre-formatted sections 3003 and the MO sections 3002, and are used during the recording of information in the data section 1703. Namely, a phase error or other error may occur between the signal for detecting the rotation of the spindle motor 1202 and the synchronizing signal detected per sector 3004, causing the recording start position and the recording end position on the magneto-optical disk 1201 to be shifted forward or backward. The gap sections 1704 and 1705 are meant for providing room for such a shift in position.

1.2 Recording Circuit

Figure 10:
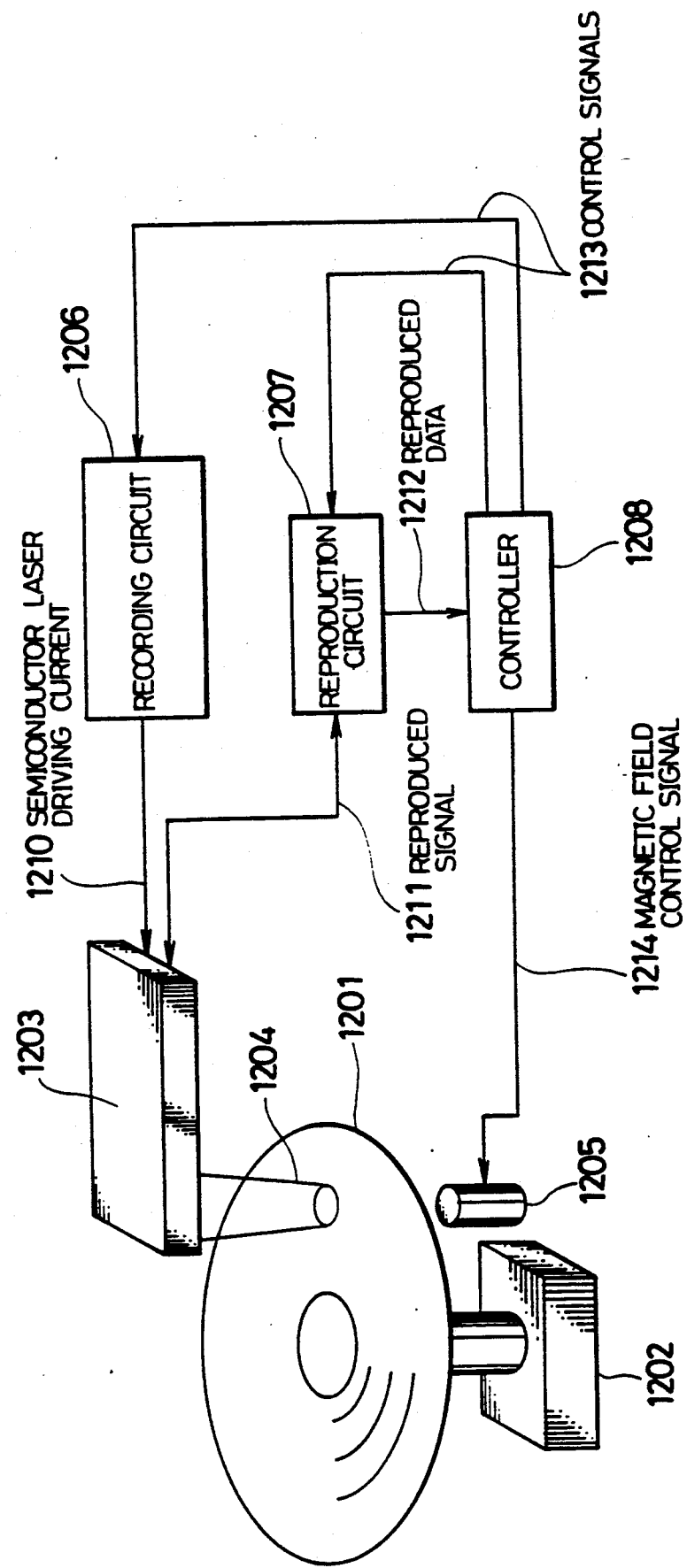
Figure 11:
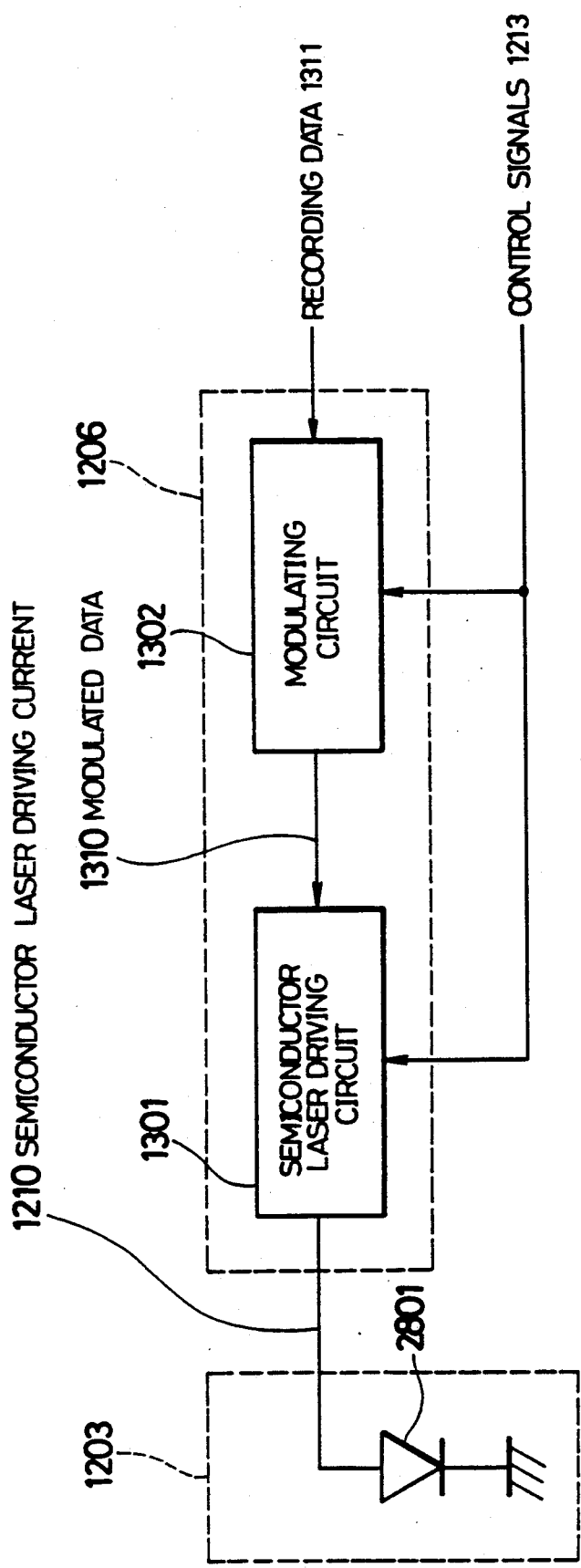

The configuration of the recording circuit 1206 shown in FIG. 10, is illustrated in FIG. 11. The recording circuit 1206 comprises a modulating circuit 1302 and a semiconductor laser driving circuit 1301. Recording data 1311 is sent into the modulating circuit 1302 where it is converted in accordance with the control signals 1213 and according to a predetermined format, into modulated data 1310. The modulation method adopted here may be for instance the 2-7 modulation method to be described later. The semiconductor laser driving circuit 1301 generates the semiconductor laser driving current 1210 in accordance with the modulated data 1310 that was supplied thereto from the modulating circuit 1302. The semiconductor laser driving current 1210 is sent from the semiconductor laser driving circuit 1301 to the semiconductor laser 2801. At the same time, the controller 1208 supplies the control signals 1213 to the semiconductor driving circuit 1301 thereby enabling the intensity of the semiconductor laser 2801 to be controlled suitably depending on the recording, reproducing or erasing operation performed.

Figures 14, 15:
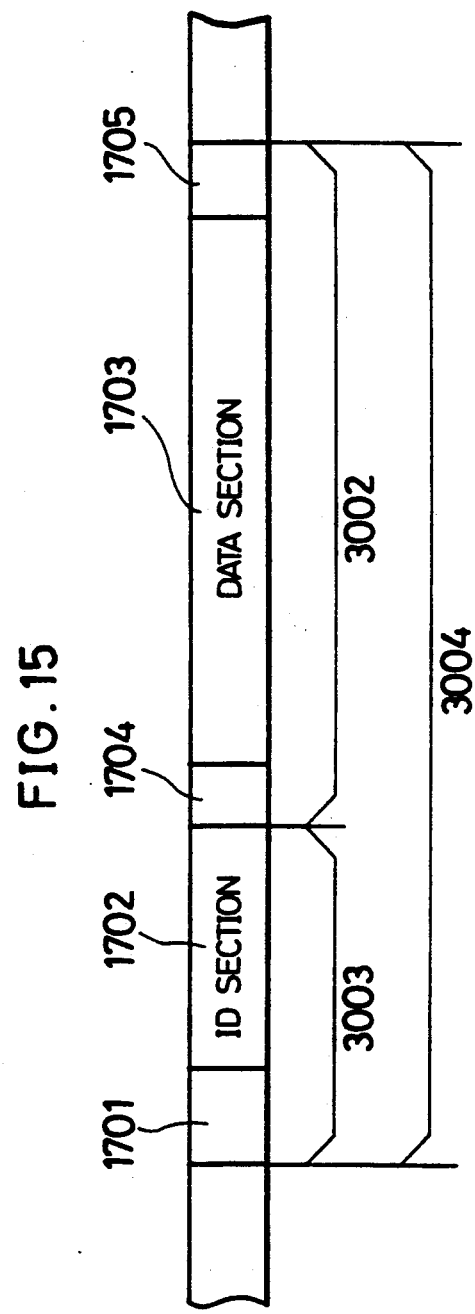

The modulation process performed in the modulating circuit 1302 is based upon the modulation method shown in FIG. 14 and called the 2-7 modulation method. The input data (recording information) shown in the left column of FIG. 14 is converted into predetermined modulated data shown in the right column. At this time, provision is made such that the number of consecutive "0" bits in the modulated data is comprised within 2 to 7. The modulated data 1310 that is conform to the sector format shown in FIG. 15, is then sent at a proper timing to the semiconductor laser driving circuit 1301 shown in FIG. 11.

1.3 Reproduction Circuit

Figure 12:
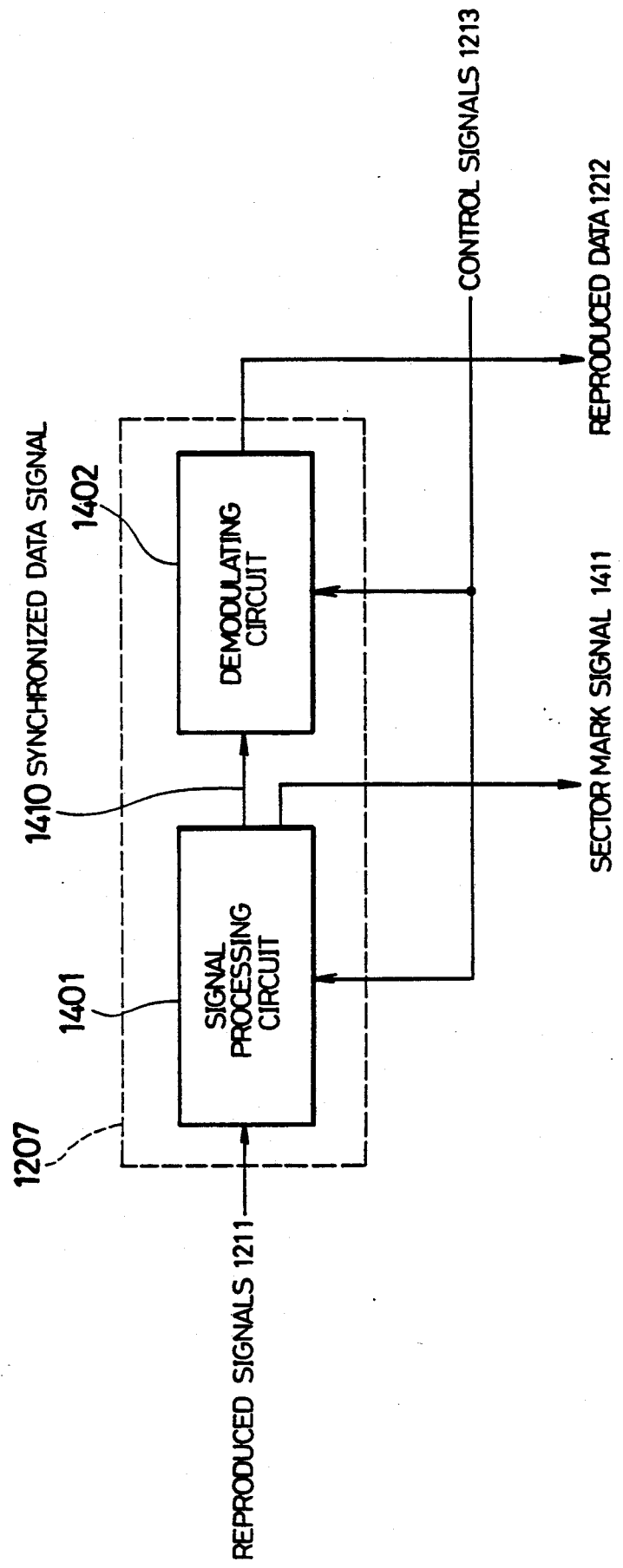

The configuration of the reproduction circuit 1207 shown in FIG. 10 is illustrated in FIG. 12. The reproduction circuit 1207 comprises a signal processing circuit 1401 and a demodulating circuit 1402. The reproduced signals 1211 (i.e. the reproduced signals S1 and S2) are fed from the optical head 1203 shown in FIG. 10, into the signal processing circuit 1401 where synchronized data signal 1410 is detected from the reproduced signals 1211. In addition, the signal processing circuit 1401 sends the detected synchronized data signal 1410 to the demodulating circuit 1402 and simultaneously, sends a sector mark signal 1411 to the controller 1208. The demodulation process of the synchronized data signal 1410 is performed in the demodulation circuit 1402 by following the modulating operation executed in the modulating circuit 1302 shown in FIG. 11 in reverse. The various control signals 1213 are fed from the controller 1208 into the signal processing circuit 1401 and the demodulating circuit 1402. The demodulating circuit 1402 sends the demodulated reproduced data 1212 to the controller 1208.

1.4 Controller

The configuration of the controller 1208 shown in FIG. 10 will be described with reference to FIG. 13. The controller 1208 comprises a timing generating circuit 1501 and a control circuit 1502. The sector mark signal 1411 is sent from the signal processing circuit 1401 shown in FIG. 12 to the timing generating circuit 1501 that generates a reference timing signal 1510 synchronized with each sector 3004. The reference timing signal 1510 as well as the reproduced data 1212 from the demodulating circuit 1402 shown in FIG. 12 are fed into the control circuit 1502 that generates the various control signals 1213 based on these two input signals. The control circuit 1502 also executes the input/output of information from/to outer devices.

1.5 Semiconductor Laser Driving Circuit

Figure 16:
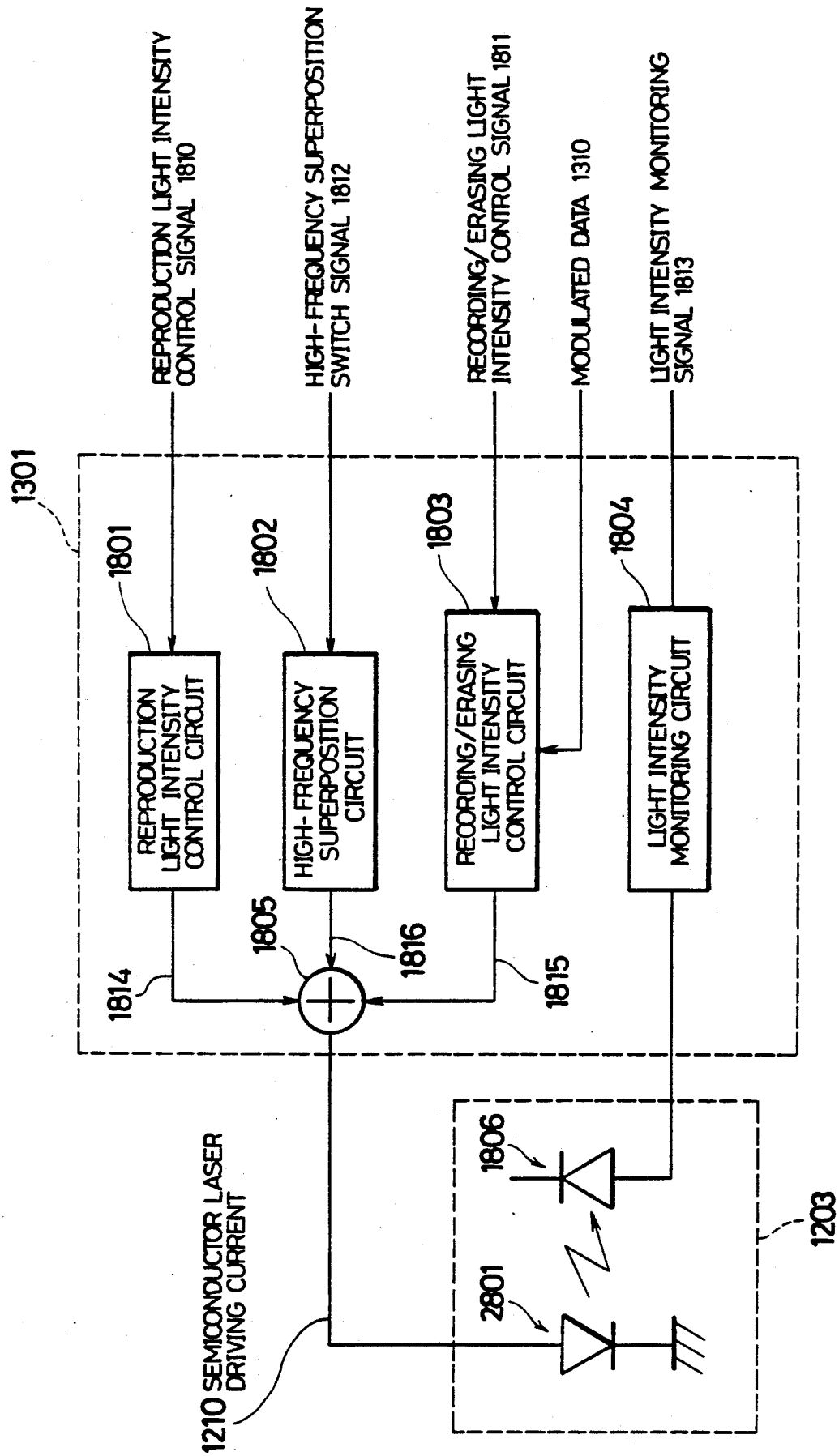

The configuration of the semiconductor laser driving circuit 1301 shown in FIG. 11 will be described in details with reference to FIG. 16. The semiconductor laser driving circuit 1301 comprises a reproduction light intensity control circuit 1801, a high-frequency superposition circuit 1802, a recording/erasing light intensity control circuit 1803, a light intensity monitoring circuit 1804 and an adder 1805. A reproduction light intensity control signal 1810 is fed from the controller 1208 shown in FIG. 10 into the reproduction light intensity control circuit 1801 thereby permitting the intensity of the light emitted by the semiconductor laser 2801 housed within the optical head 1203 to be controlled appropriately during the reproduction. The modulated data 1310 from the modulating circuit 1302 shown in FIG. 11 and a recording/erasing light intensity control signal 1811 from the controller 1208 are fed into the recording/erasing light intensity control circuit 1803. Provision is made such that the recording/erasing light intensity control circuit 1803 controls the intensity of the light emitted by the semiconductor laser 2801 during recording/erasing. The controller 1208 supplies a high-frequency superposition switch signal 1812 to the high-frequency superposition control circuit 1802. Based on the high-frequency superposition switch signal 1812, the high-frequency superposition control circuit 1802 releases an output signal 1816 that goes ON and OFF with a high frequency. The output signal 1816 released by the high-frequency superposition circuit 1802 and an output signal 1814 released by the reproduction light intensity control circuit 1801 are superposed in the adder 1805. Such an arrangement permits to reduce the noise occurring in the semiconductor laser 2801 due to the return light reflected back from the magneto-optical disk 1201 to the semiconductor laser 2801. The output signal 1816 released by the high-frequency superposition circuit 1802 is sent to the adder 1805 exclusively during reproduction.

During reproduction, the sum of the output signal 1814 released by the reproduction light intensity control circuit 1801 and the output signal 1816 released by the high-frequency superposition circuit 1802 is performed in the adder 1805 and supplied as the semiconductor laser driving current 1210 to the semiconductor laser 2801. Meanwhile during recording, an output signal 1815 released by the recording/erasing light intensity control circuit 1803 is supplied as semiconductor laser driving current 1210 to the semiconductor laser 2801 via the adder 1805.

The light intensity (light quantity) of the semiconductor laser 2801 is converted into an electric signal by means of a photodetector 1806 housed within the optical head 1203. Based on the output released by the photodetector 1806 the light intensity monitoring circuit 1804 generates a light intensity monitoring signal 1813 that is sent to the controller 1208. The reproduction light intensity control signal 1810, the recording/erasing light intensity control signal 1811, and the high-frequency superposition switch signal 1812 are released by the controller 1208 based on the light intensity monitoring signal 1813. In other words, the light intensity of the semiconductor laser 2801 is controlled to an appropriate intensity for reproduction for recording/erasing.

2. Recording/Erasing/Reproduction Operations

Recording and erasing operations will be discussed hereinbelow.

Figure 17:
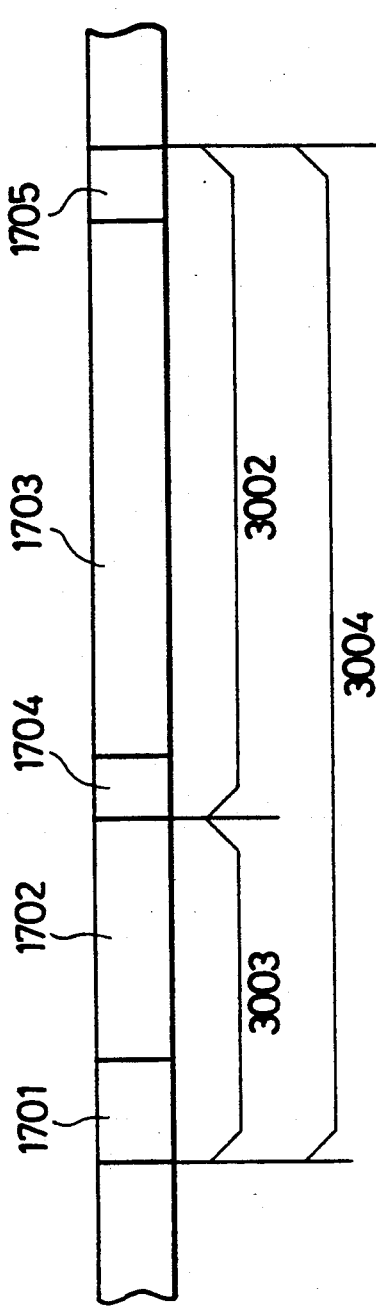

As illustrated by (b) in FIG. 17, the high-frequency superposition switch signal 1812 goes to the low level ("0") when recording/erasing is executed in the data section 1703 (see (a) of FIG. 17). When recording/erasing is performed in sections other than the data section 1703, the high-frequency superposition switch signal 1812 stays in the high level ("1"). Namely, the high-frequency superposition switch circuit 1802 disables the high-frequency superposition when the data section 1703 is recorded/erased, and enables the high-frequency superposition when sections other than the data section 1703 are recorded/erased, in response to the high-frequency superposition switch signal 1812. During recording, the modulated data 1310, as shown by (c) in FIG. 17, is recorded through magneto-optical recording in the data section 1703. During erasing, the modulated data 1310 is erased from the data section 1703. At this time, the light intensity level 1910 of the semiconductor laser 2801 is high when recording/erasing is performed in a data section 1703, and low when recording/erasing is performed in sections other than the data section 1703, as illustrated by (d) in FIG. 17. Here, information is recorded/erased in the MO section 3002 while synchronized data is detected from the sector mark section 1701, the address information is read out from the ID section 1702 and the given address where recording/erasing is to be performed, is confirmed.

Meanwhile, when information recorded in the data section 1703 is reproduced, the high-frequency superposition switch signal 1812 is in the high level ("1") for both the pre-formatted section 3003 and the MO section 3002, as shown by (b) in FIG. 18. Besides, the modulated data 1310 is in the low level ("0"), as shown by (c) in FIG. 18, as there is no recording operation. Further, the light intensity level 1910 as shown by (d) in FIG. 18, is lower than the light level 1910 shown by (d) in FIG. 17. In other words, recorded pieces of information are reproduced from the MO sections 3002 while the synchronized data of the sectors 3004 is detected from the sector mark sections 1701 within the pre-formatted sections 3003, address information and other information are read out from the ID sections 1702 and the given addresses where reproduction is to be performed are confirmed, one after another.

3. Detailed Configuration and Operation

3.1 Timing Generating Circuit

The configuration of the timing generating circuit 1501 shown in FIG. 13 will be described in details with reference to FIG. 19, and the flow of signals released in different sections of the timing generating circuit 1501 will be described briefly. The generating process of the various signals will be covered later.

The timing generating circuit 1501 comprises a sector mark detection circuit 2101 where the sector mark signal 1411 released by the signal processing circuit 1401 shown in FIG. 12, is fed to. The sector mark detection circuit 2101 detects the presence/absence of the sector mark recorded in the sector mark section 1701 such as shown in FIG. 17(a), and releases a corresponding sector mark detection signal 2110. The sector mark detection signal 2110 is sent from the sector mark detection circuit 2101 to a counter 2102, a timer circuit 2104 and a judging circuit 2106. The sector mark detection signal 2110 is employed for the synchronization control required while recording, erasing or reproduction is performed sector 3004 by sector 3004. The timer circuit 2104 releases and sends an output signal 2113 to a window generating circuit 2105. The window generating circuit 2105 releases and sends an output signal 2114 to the judging circuit 2106. The judging circuit 2106 generates a timing judge signal 2115 derived from the output signal 2114 and the sector mark detection signal 2110. The timing judge signal 2115 is sent to the control circuit 1502 shown in FIG. 13, and to a switch circuit 2103. The respective output signals 2111 and 2112 of the counter 2102 and timer circuit 2104 are sent to the switch circuit 2103. In the switch circuit 2103, one of the input signals 2111 and 2112 is selected in accordance with the timing judge signal 2115, as will be described later, and sent as reference timing signal 1510 to the control circuit 1502 and a data section judging circuit 2107. The data section judging circuit 2107 releases and sends a data section judge signal 2116 derived from the reference timing signal 1510, to the control circuit 1502.

The above-mentioned various control signals 1213 are generated by the control circuit 1502 based on the signals 1510, 2115 and 2116 released by the different circuits of the timing generating circuit 1501, and on the reproduced data 1212. The control signals 1213 are sent to the recording circuit 1206 and the reproduction circuit 1207 shown in FIG. 10 thereby permitting the different controls required for recording/reproducing/erasing information to be executed.

3.2 Sector Mark Detection Circuit

Figure 20:
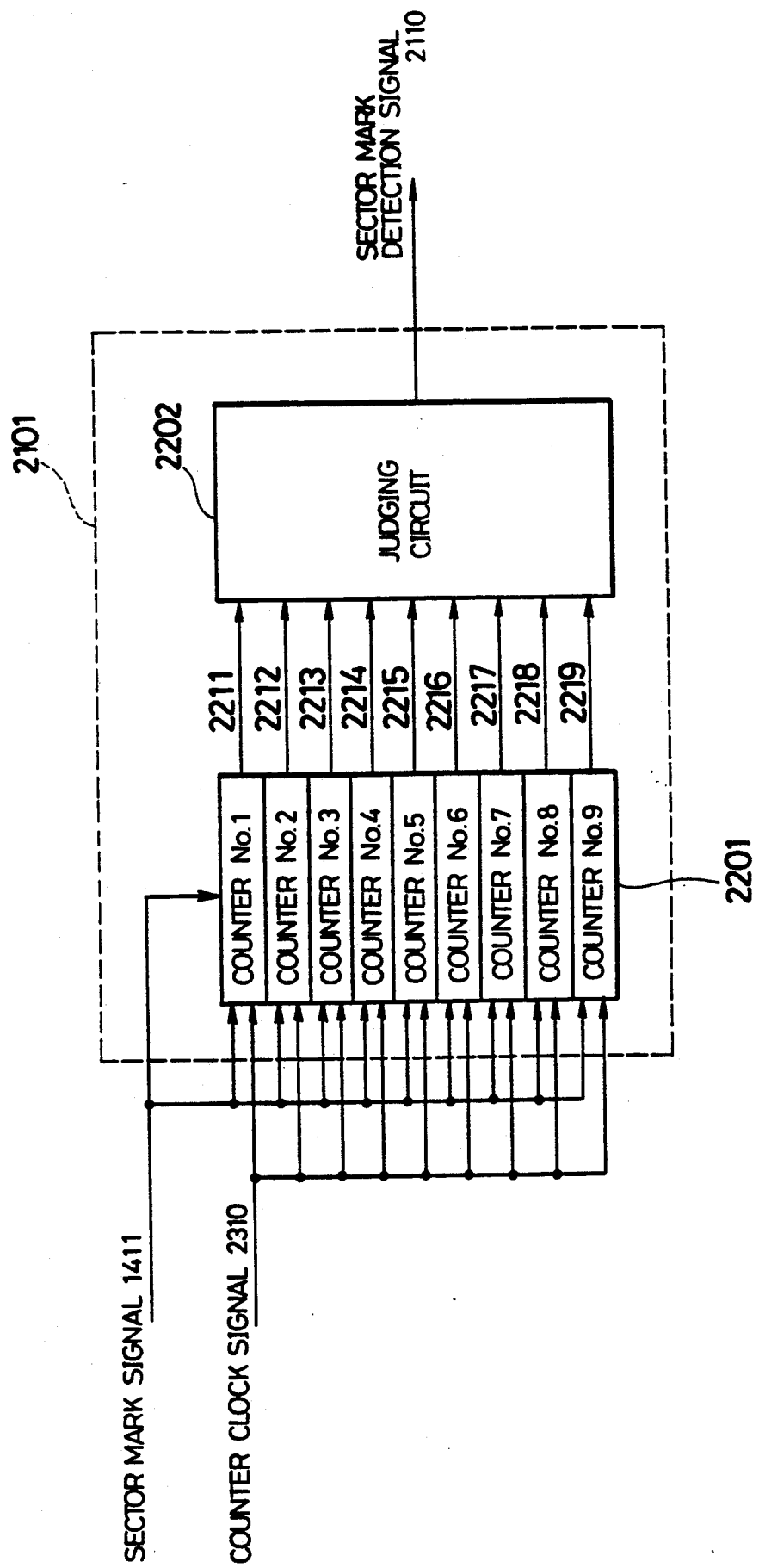

The configuration of the sector mark detection circuit 2101 will be described with reference to FIG. 20.

The sector mark detection circuit 2101 comprises a counter circuit 2201 composed of for example nine counters No. 1 to No. 9. The sector mark signal 1411 released by the signal processing circuit 1401 shown in FIG. 12, as well as a counter clock signal 2310 are fed into each of the counters No. 1 to No. 9. Detection signals 2211 to 2219 are released by the counters NO. to No. 9 respectively, and are sent to a judging circuit 2202. The sector mark detection signal 2110 is then released in response to the judgement made in the judging circuit 2202 to be described later.

The operation of the counters No. 1 to No. 9 accommodated in the counter circuit 2201 will be described with reference to FIG. 21.

Figure 21:
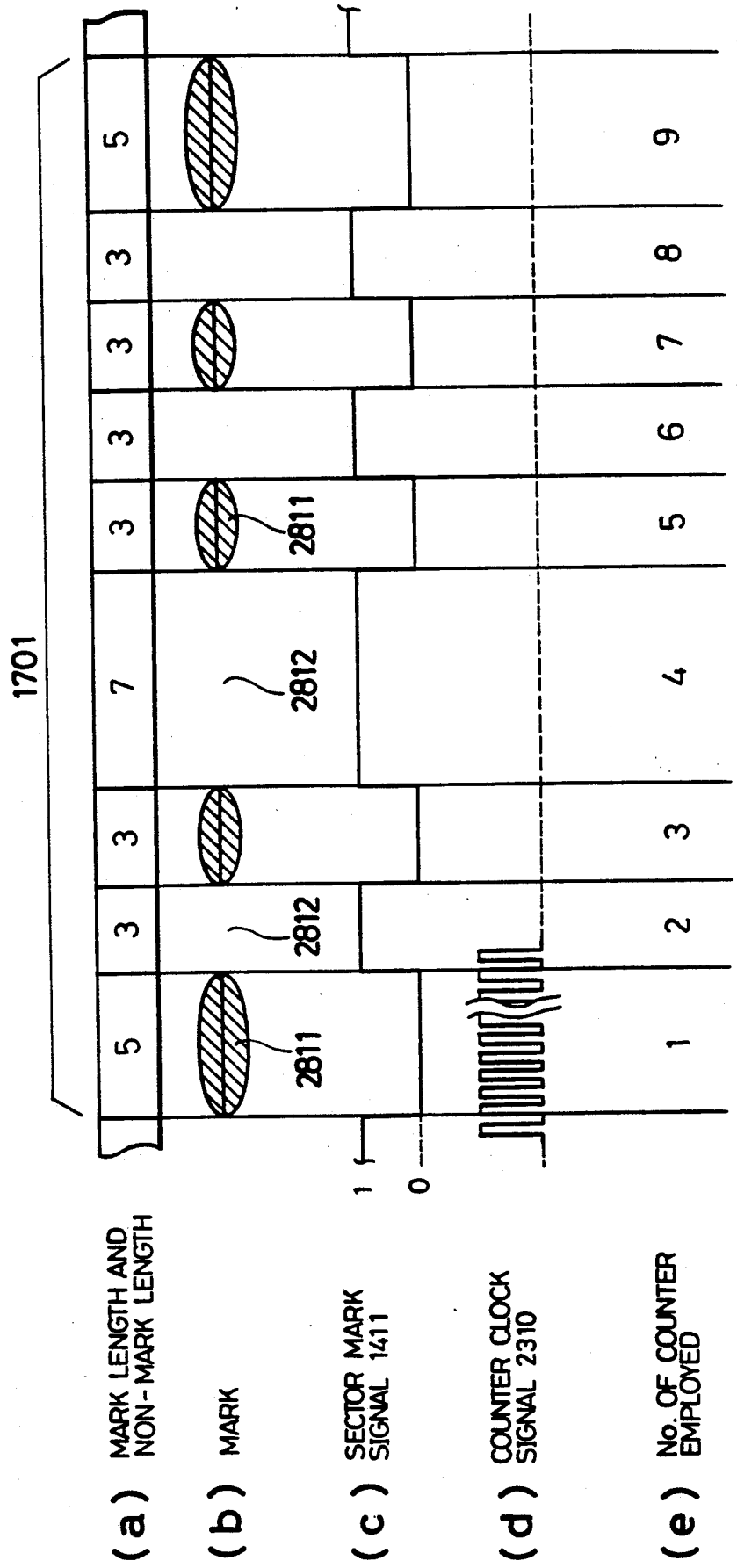

Here it is supposed that the synchronized data of the sector mark section 1701 is recorded in a pattern composed of marks 2811 and non-marks 2812 such as shown by (b) in FIG. 21. In this example, a plurality of marks 2811 are etched such that the ratio of the lengths of marks to the lengths of non-marks is equal to 5:3:3:7:3:3:3:3:5 in this order, such as shown by (a) in FIG. 21. Provision is made such that this recording pattern is completely different from the recording pattern of the ID section 1702 and the recording pattern of the data section 1703 (2-7 modulation). The sector mark section 1701 can be thus detected separately from the ID section 1702 and data section 1703. The sector mark signal 1411 mentioned above that is generated by the signal processing circuit 1401 shown in FIG. 12, can be obtained as marks 2811 and non-marks 2812 recorded in the above pattern are read out. The sector mark signal 141; is a binary signal such as shown by (c) in FIG. 21, and is in the low level ("0") when for instance a mark 2811 is read, and in the high level ("1") when a non-mark 2812 is read.

When the sector mark signal 1411 is fed into each of the counters No. to No. 9, first the counter No. I counts the number of clock pulses of the counter clock signal 2310 corresponding to the mark length "5", as shown by (d) and (e) in FIG. 21. As shown by (d) in FIG. 21, the frequency of the counter clock signal 2310 is higher than the frequency of the sector mark signal 1411. If the counted number is comprised within a predetermined range, the counter No. 1 determines that the first mark 2811 (mark length "5") has been detected accurately, and releases and sends the detection signal 2211 to the judging circuit 2202, as illustrated in FIG. 20. Similarly, the counter No. 2 detects a non-mark 2812 (non-mark length "3") and releases the detection signal 2212. Counters No. 3 to No. 8 then detect successively the marks 2811 and non-marks 2812 of the sector mark section 1701 and release the detection signals 2213 to 2218. Finally, the counter No. 9 detects the last mark 2811 (mark length "5") and releases the detection signal 2219. The judging circuit 2202 determines whether the nine results obtained as the marks 2811 and non-marks 2812 are detected, totally or partially coincide with the recording pattern of the sector mark section 1701, and examines the sequence of marks 2811 and non-marks 2812. The sector mark detection signal 2110 shown in FIG. 19 and FIG. 20, consequently changes to the low level ("0") only when it was determined that a sector mark section 1701 was detected. With the above arrangement, the sector mark detection signal 2110 may thus be used as a synchronizing signal corresponding to each sector 3004.

3.3 Various Signals Generated in the Timing Generating Circuit

The generation process of various signals in the timing generating circuit 1501 will be described hereinafter with reference to FIG. 22.

Figure 22:
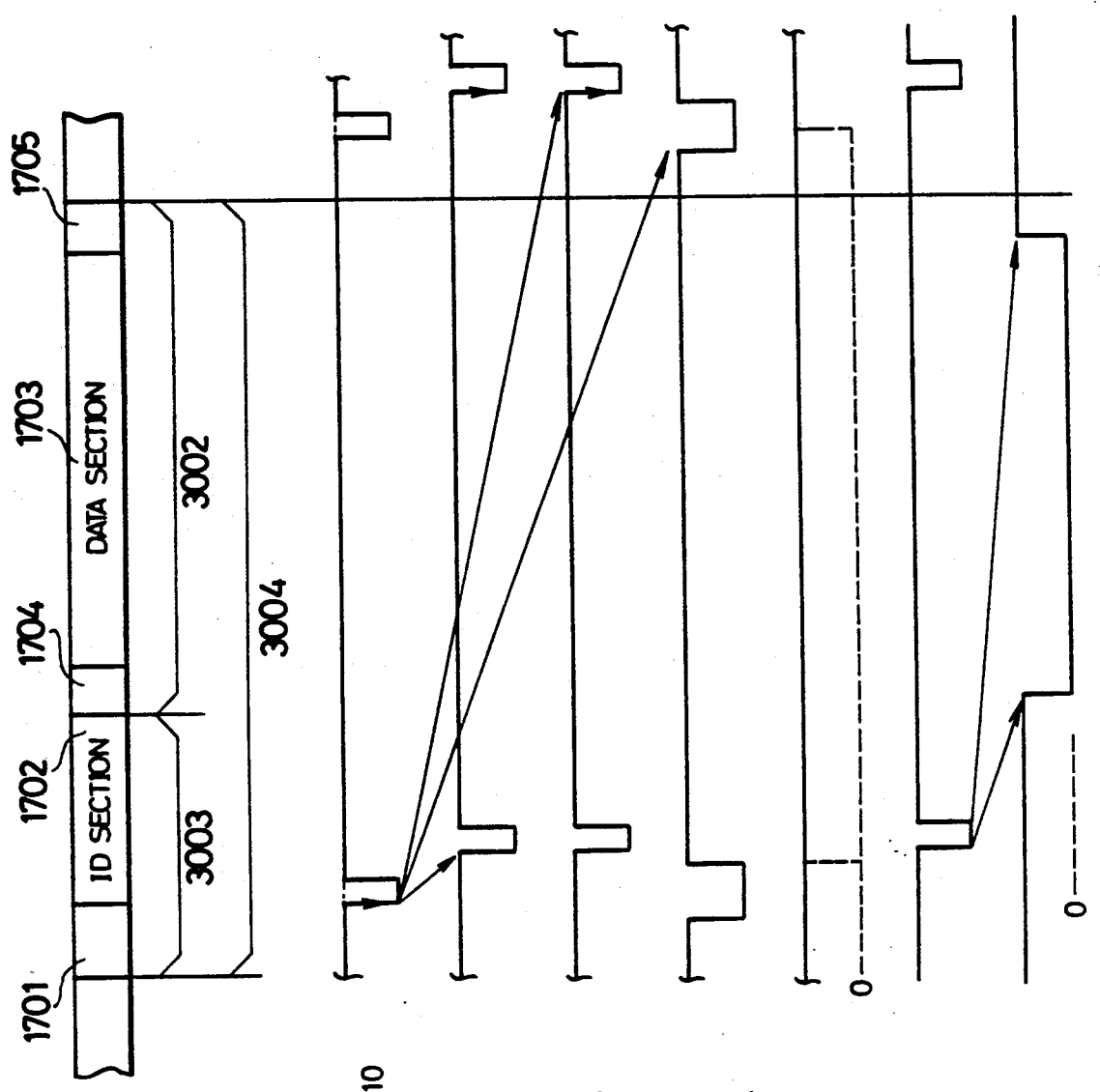

As shown by (b) in FIG. 22, the sector mark detection signal 2110 released by the sector mark detection circuit 2101, goes to the low level when the sector mark section 1701 of the pre-formatted section 3003 (see (a) in FIG. 22) is detected, as it was described earlier. Therefore, one drop to the low level of the sector mark detection signal 2110 corresponds to one sector 3004. As shown by (c) in FIG. 22, the counter 2102 shown in FIG. 19 starts to count simultaneously with the falling of the sector mark detection signal 2110, and releases a low level counter output signal 2111 when a predetermined number of counts is reached. The timer circuit 2104 shown in FIG. 19 starts to count simultaneously with the falling of the sector mark detection signal 2110, and counts a number equivalent to the count of the counter 2102 plus a predetermined count corresponding to the length of one sector 3004. As a result, as shown by (d) in FIG. 22, the falling edge of an output signal 2112 released by the time circuit 2104 coincides approximately with the falling edge of the counter output signal 2111 of the following sector 3004. As shown by (e) in FIG. 22, the output signal 2114 of the window generating circuit 2105 shown in FIG. 19 uses the sector mark detection signal 2110 falling edge as a reference and goes in the low level with a prescribed window width in the vicinity of the falling edge of the sector mark detection signal 2110 for the following sector 3004. Provision is made such that the timing judge signal 2115, i.e. the output signal of the judging circuit 2106 shown in FIG. 19, stays in the high level as shown by the solid line in FIG. 22(f), when the sector mark detection signal 2110 falls while the output signal 2114 released by the window generating circuit 2105 is in the low level. On the other hand, if the sector mark detection signal 2110 does not fall while the output signal 2114 is in the low level, the timing judge signal 2115 changes to the low level, as shown by the broken line in FIG. 22(f). Therefore, the timing judge signal 2115 serves for determining whether the sector mark section 1701 was detected within the permissible range.

Figure 19:
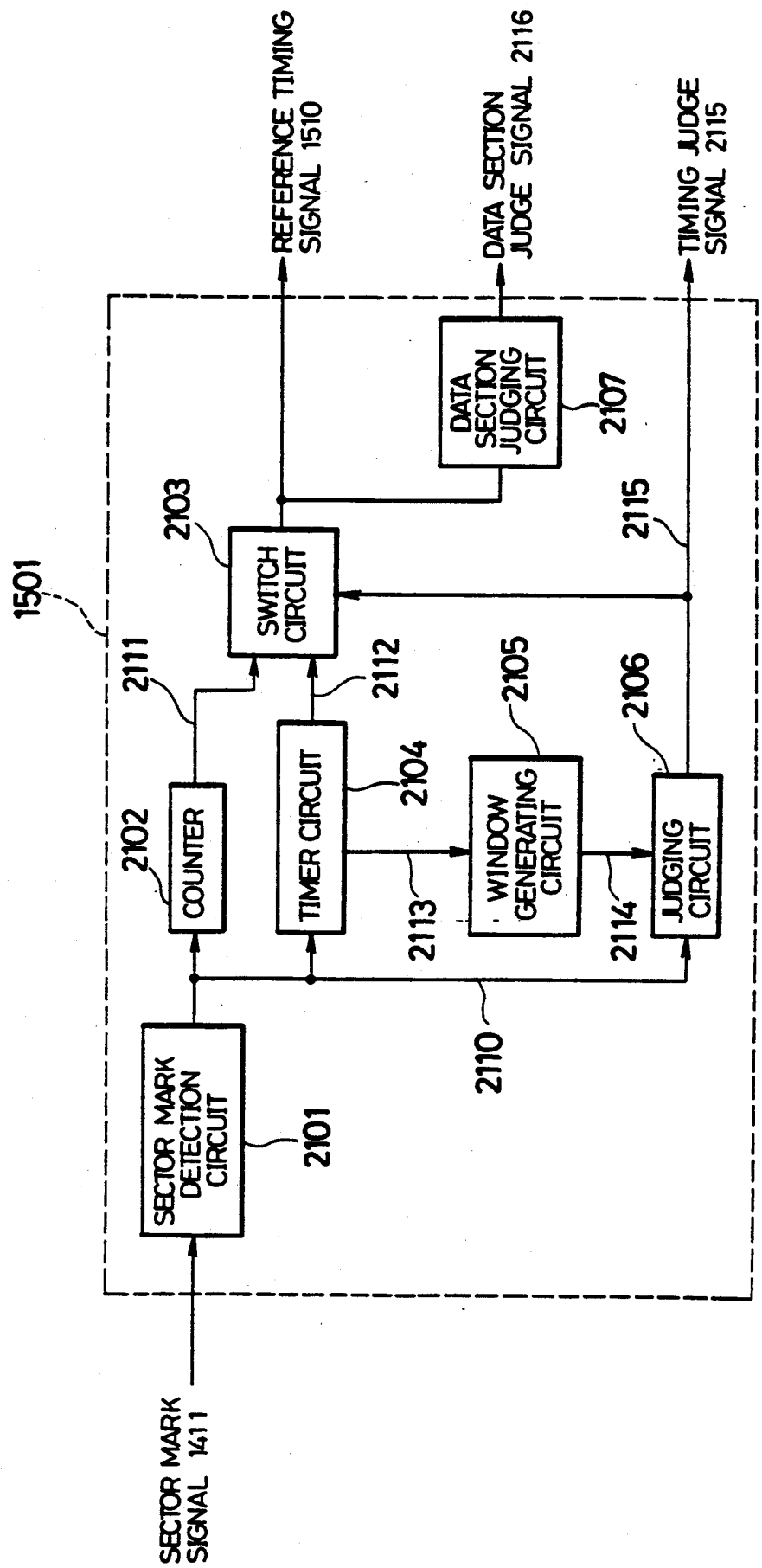

Based on the timing judge signal 2115 supplied from the judging circuit 2106, the switch circuit 2103 shown in FIG. 19 selects the counter output signal 2111 when the sector mark section 1701 was detected in the permissible range, and selects the timer circuit output signal 2112 when a detection error occurred. As a result, even when an error occurred in the detection of the sector mark section 1701 causing the counter output signal 2111 to be missing, compensation is made by the timer circuit output signal 2112 that was generated based on the prior sector 3004. Such an arrangement thus permits the reference timing signal 1510 to be released accurately, as shown by (g) in FIG. 22.

The reference timing signal 1510 obtained as described above is then transmitted to the data section judging circuit 2107 shown in FIG. 19. The data section judging circuit 2107 is constituted by one type of counter, and starts counting simultaneously with the drop to the low level of the reference timing signal 1510 that was fed thereto from the switch circuit 2103. The data section judging circuit 2107 releases a data section judge signal 2116 that goes in the low level for the data section 1703 of the MO section 3002, as shown by (h) in FIG. 22. In other words, the data section judge signal 2116 may be used as a signal for distinguishing the pre-formatted section 3003 and the MO section 3002.

Figure 13:
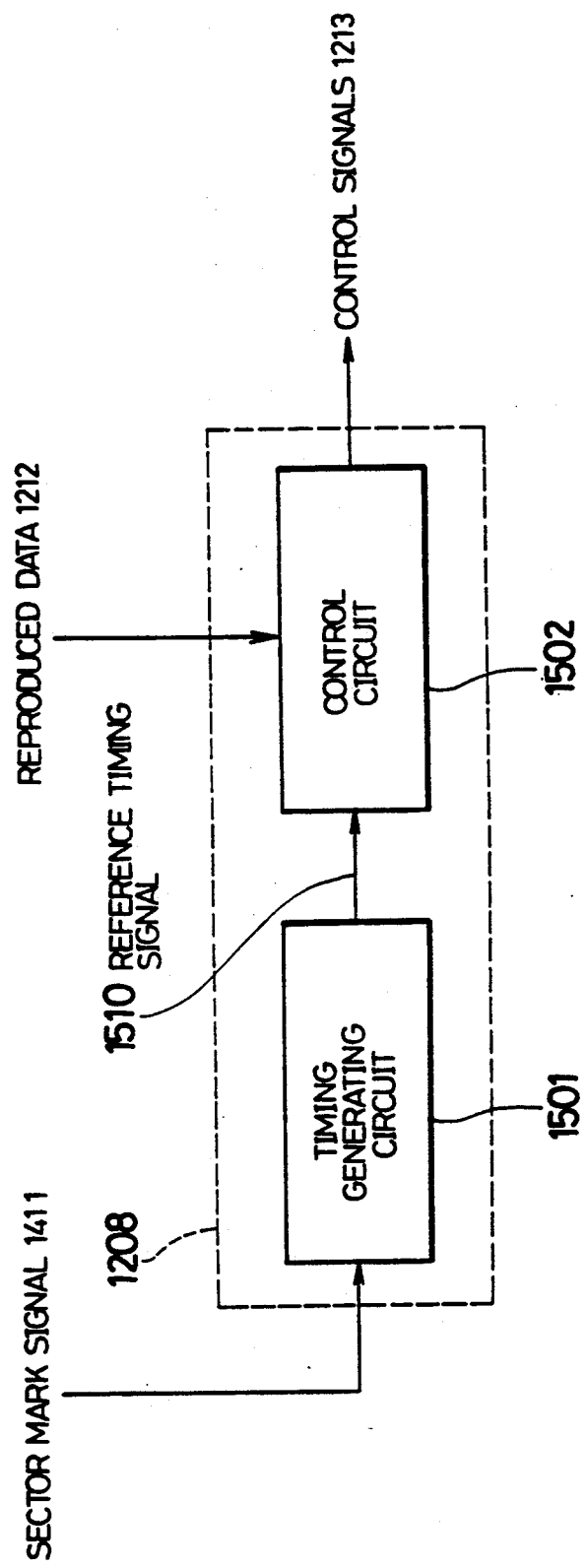

The reference timing signal 1510, the timing judge signal 2115 and the data section judge signal 2116 that were produced as described above, are transmitted to the control circuit 1502 shown in FIG. 13. The various control signals 1213 are generated in the control circuit 1502 based on the Signals 1510, 2115 and 2116.

3.4 Signal Processing Circuit

The configuration and operation of the signal processing circuit 1401 shown in FIG. 12 will be discussed with reference to FIGS. 23 to 25.

Figure 23:
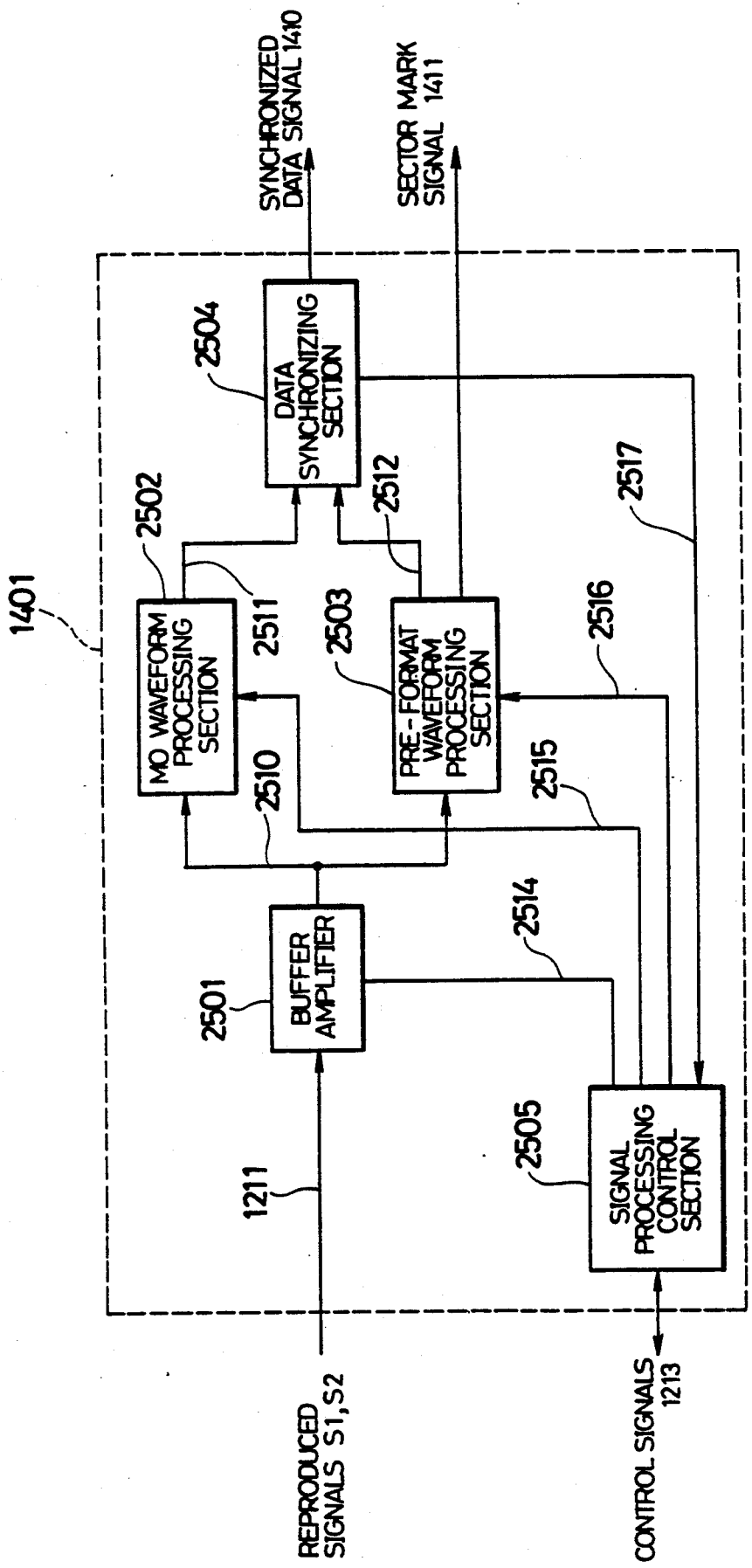

The reproduced signals 1211 (i.e. the reproduced signals S1 and S2) that were read from the magneto-optical disk 1201 are fed into a buffer amplifier 2501 housed within the signal processing circuit 1401, as illustrated in FIG. 23. The buffer amplifier 2501 releases output signals 2510 that are sent to a MO waveform processing section 2502 and a pre-format waveform processing section 2503. The difference of the reproduced signals S1 and S2 is determined in the MO waveform processing section 2502 and a binary MO signal 2511 is generated in accordance with the marks 2809 and non-marks 2810 recorded in the MO section 3002. Meanwhile, in the pre-format waveform processing section 2503, the sum of the reproduced signals S1 and S2 is determined, and a binary ID signal 2512 is generated in accordance with the marks 2811 and non-marks 2812 of the pre-formatted section 3003. The binary signals 2511 and 2512 are fed into a data synchronizing section 2504. The binary signals 2511 and 2512 are synchronized with a clock signal in a PLL (Phase Locked Loop) housed in the data synchronizing section 2504, and the synchronized data signal 1410 is generated and sent to the demodulating circuit 1402 (shown in FIG. 12). The pre-format waveform processing section 2503 generates the sector mark signal 1411 that is sent to the timing generating circuit 1501 (shown in FIG. 13). A signal processing control section 2505 receives and releases various control signals 2514 to 2517 from and to the different sections of the signal processing circuit 1401 and in addition receives and releases the control signals 1213 to and from the controller 1208 shown in FIG. 10.

Figure 24:
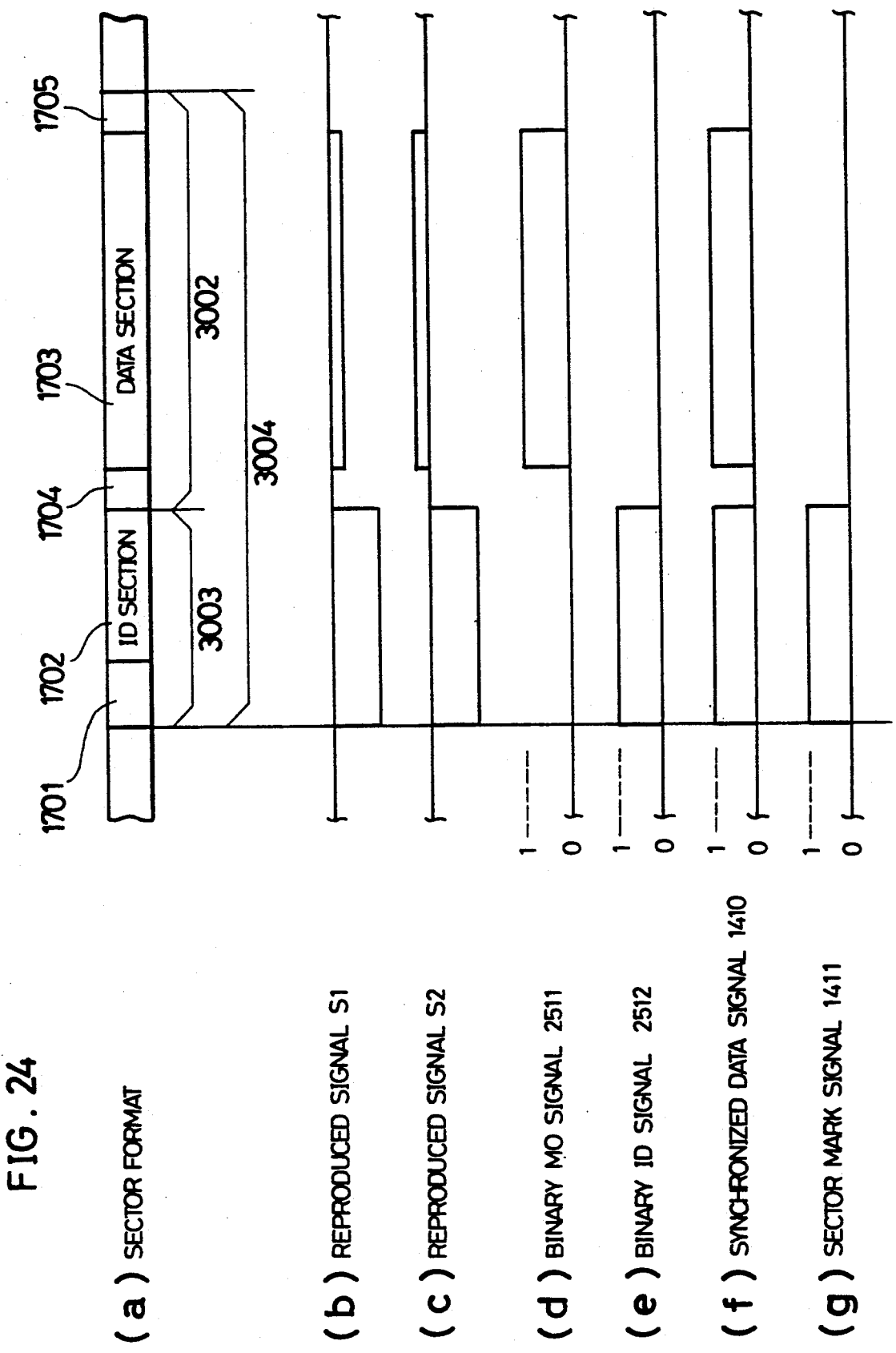
Figure 25:
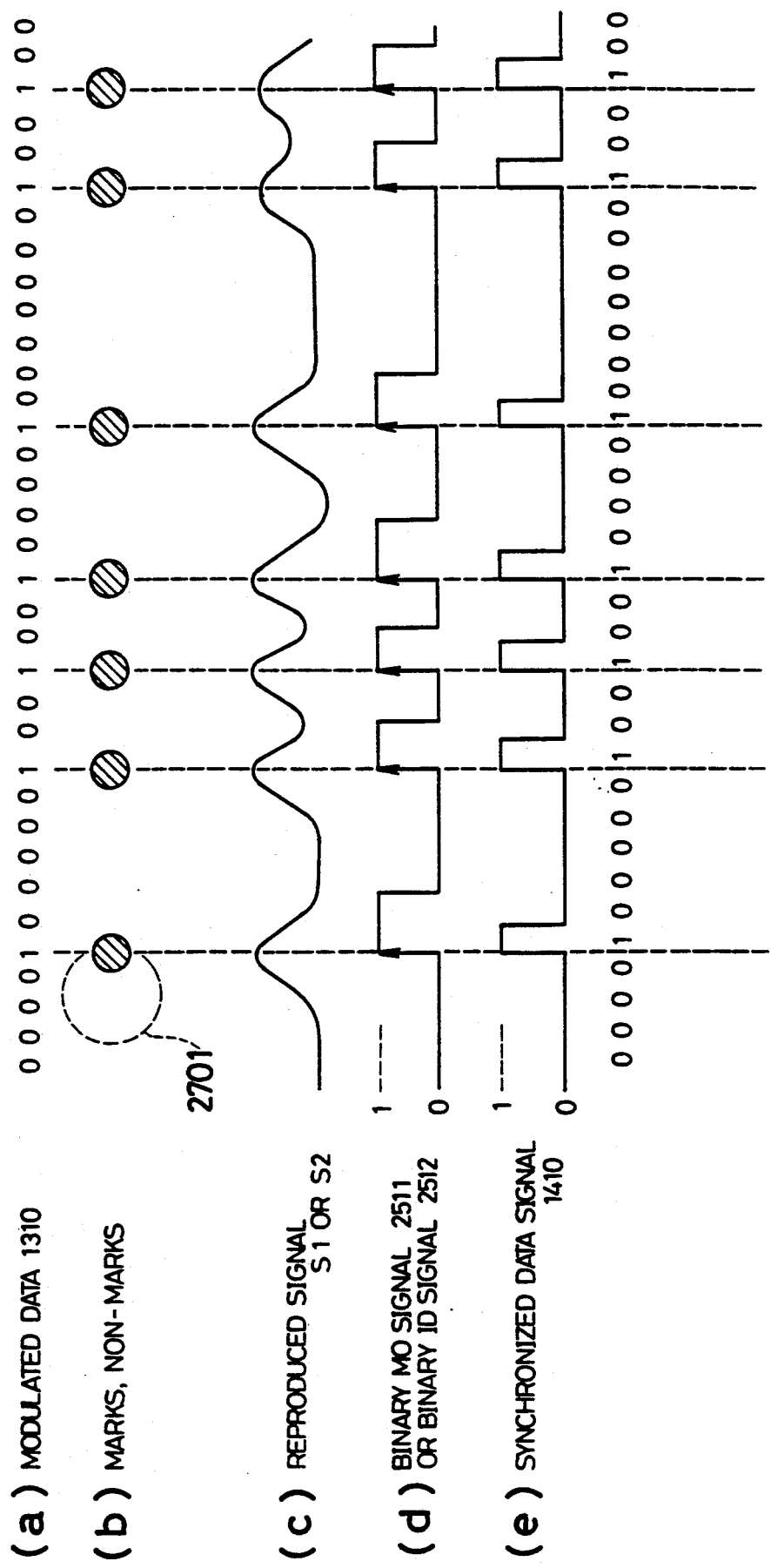
Figure 29:
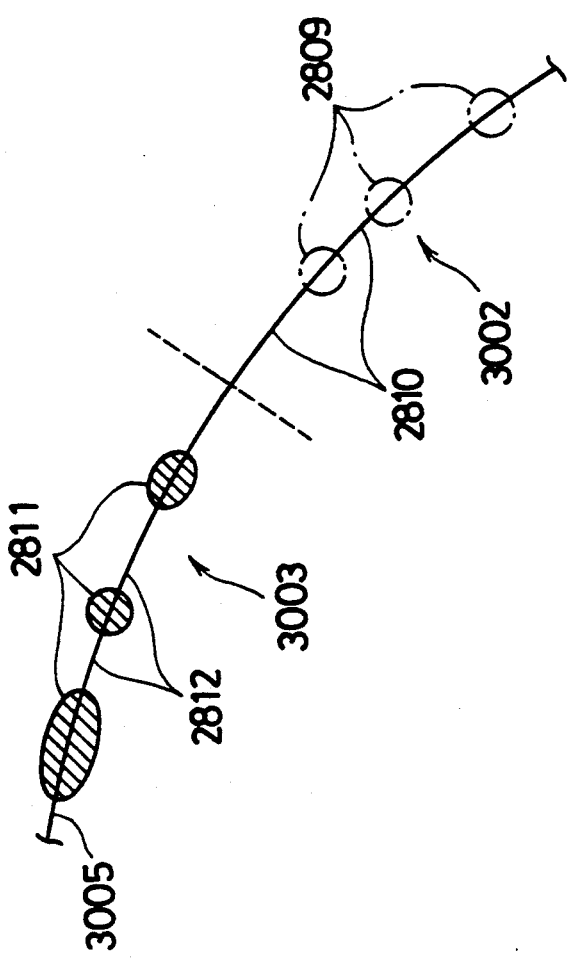
Figure 28:
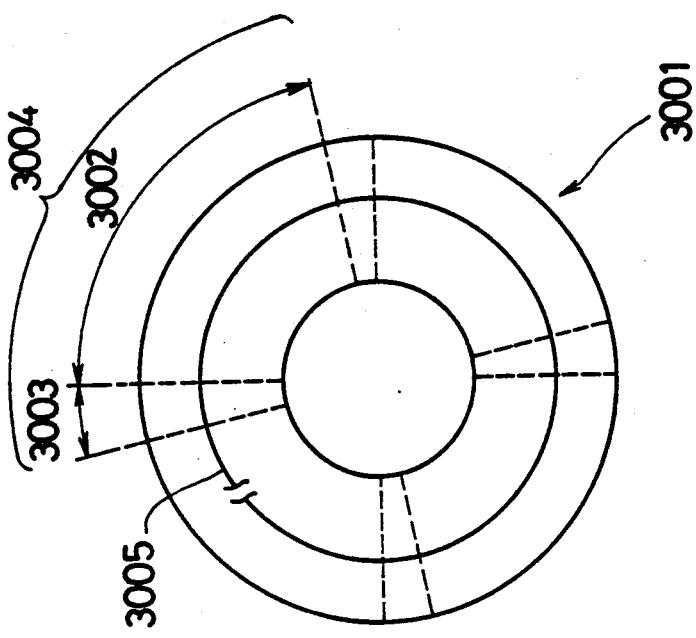
Figure 30:
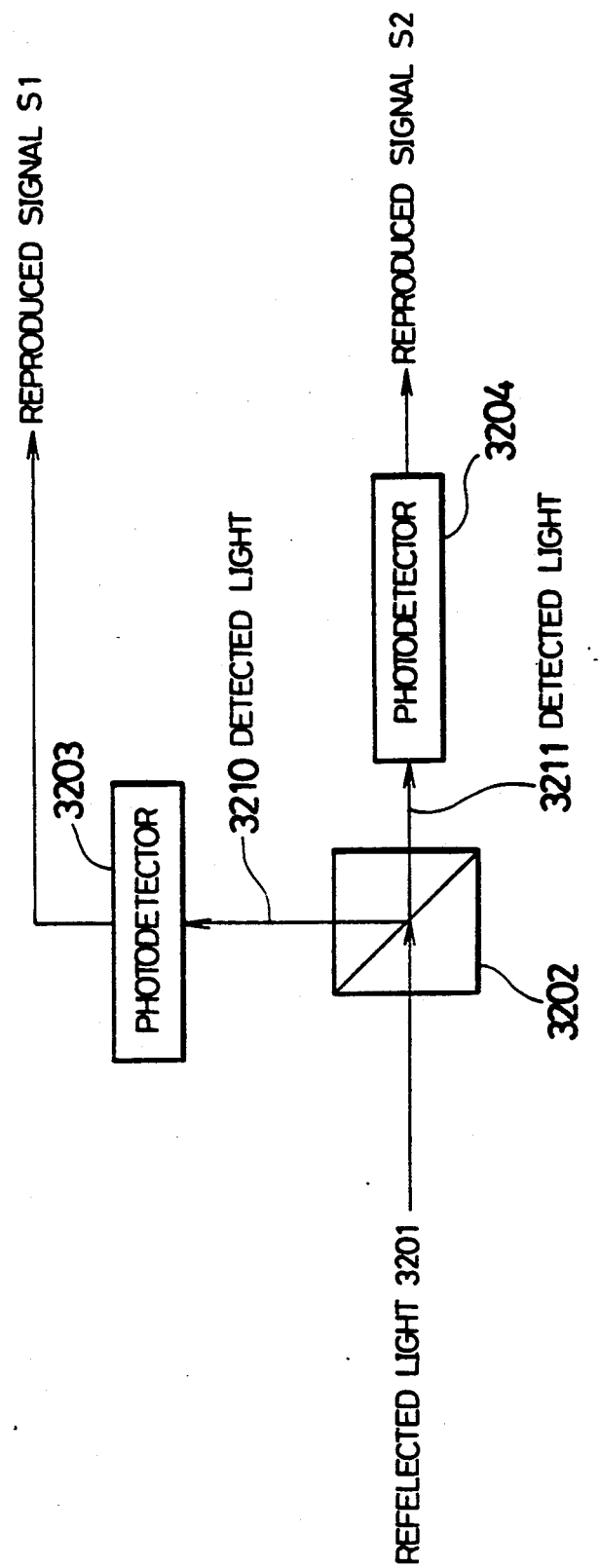

FIG. 24 and FIG. 25 illustrate the waveforms of signals generated in different sections of the signal processing circuit 1401. The MO signal corresponding to the information recorded in the MO section 3002 is isolated by determining the difference of the reproduced signals S1 and S2 shown by (b) and (c) in FIG. 24, in the MO waveform processing section 2502. The MO signal is further converted into a binary signal, and the binary MO signal 2511 that is in the low level for sections other than the MO section 3002 as shown by (d) of FIG. 24, is generated. The signal corresponding to the information recorded in the pre-formatted section 3003 is isolated by determining the sum of the reproduced signals S1 and S2 in the pre-format waveform processing section 2503. This signal is further converted into a binary signal and the binary ID signal 2512 and sector mark signal 1411 that are in the low level for sections other than the pre-formatted section 3003 as shown by (e) and (g) in FIG. 24, are generated.

Figure 31:
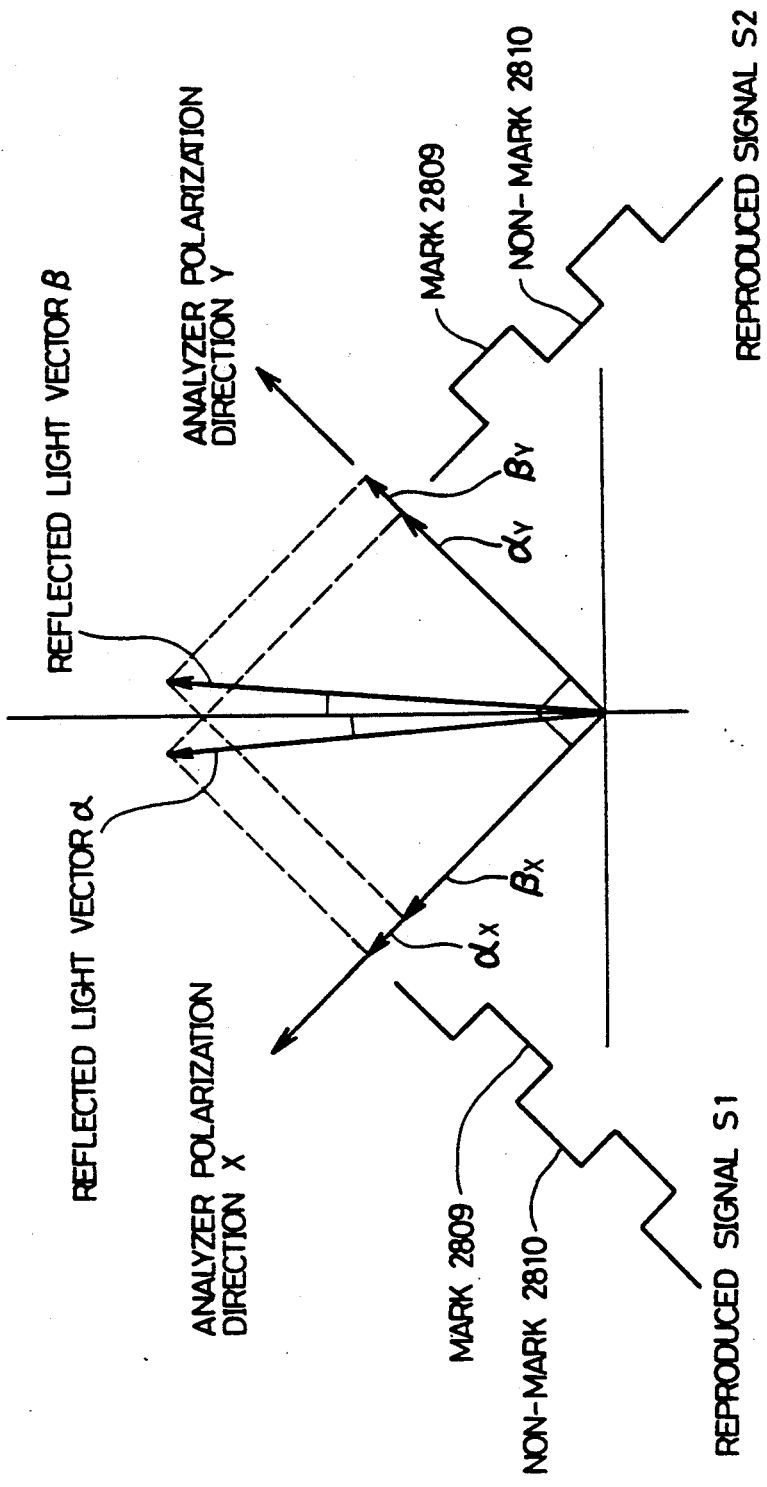
Figure 32:
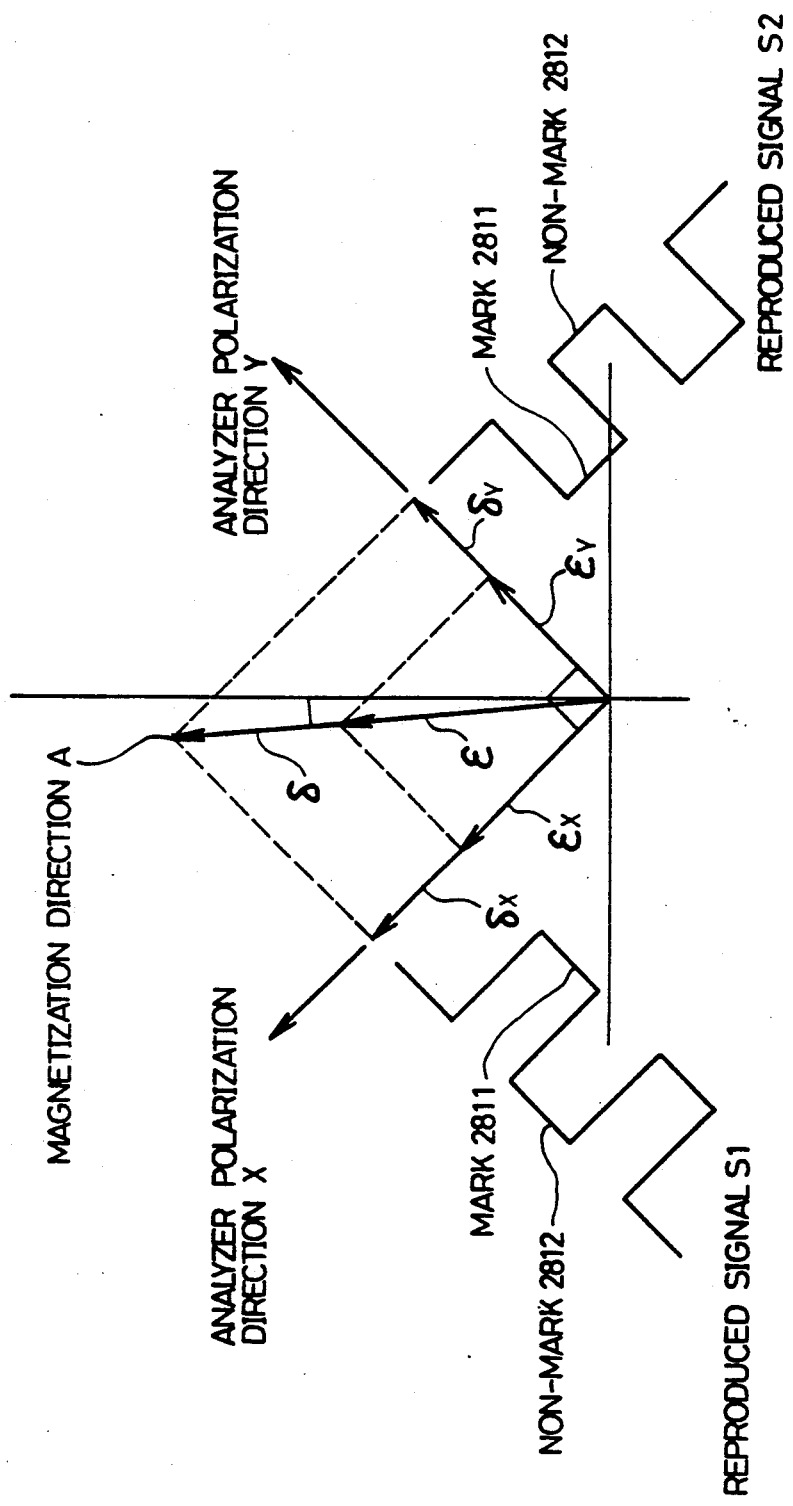
Figure 33:
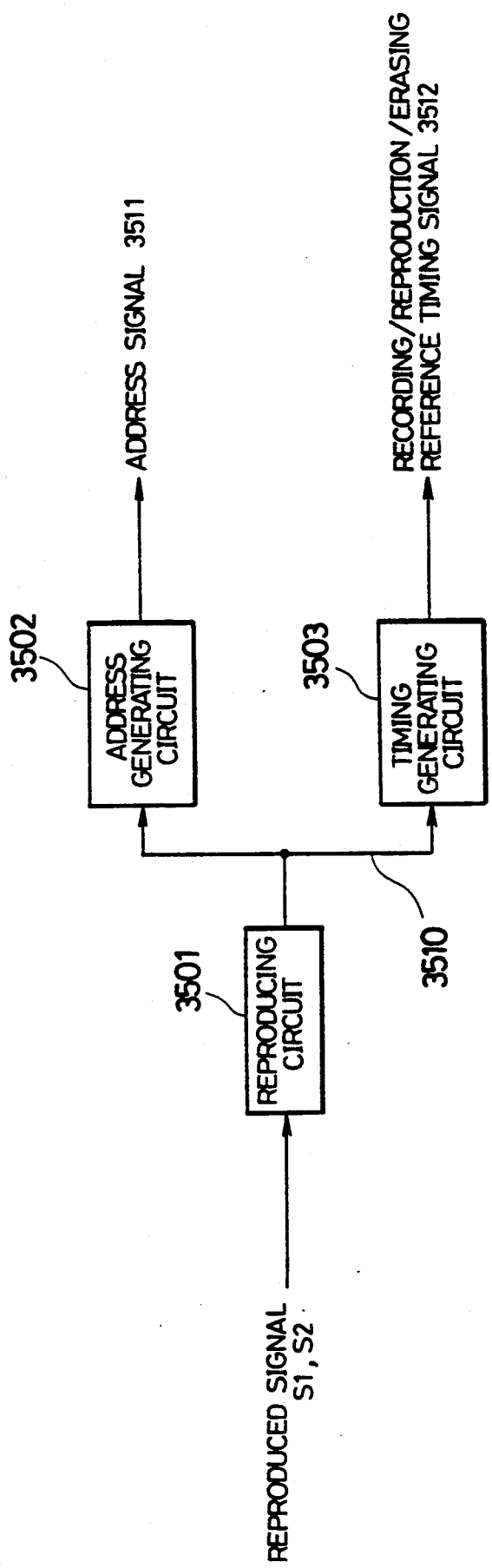

The reason why the information recorded in the MO section 3002 and the information recorded in the pre-formatted section 3003 can be separated by determining the difference and the sum of the reproduced signals S1 and S2, lies in the fact that, as illustrated in FIG. 27 with reference to FIG. 31, the reproduced signals S1 and S2 have opposite polarities in the MO section 3002, while, as illustrated in FIG. 27 with reference to FIG. 32, their polarities coincide in the pre-formatted section 3003. The binary MO signal 2511 and the binary ID signal 2512 are converted in the data synchronizing section 2504 (shown in FIG. 23) into the synchronized data signal 1410, as shown by (f) in FIG. 24, that is synchronized with the clock signal of the data synchronizing section 2504.

FIG. 25 illustrates in details the waveforms shown in FIG. 24. The marks and non-marks that were recorded in accordance with the modulated data 1310 (see (a) in FIG. 25) are read through the illumination of a laser spot 2701, as shown by (b) in FIG. 25. As shown in FIG. 25(c), the peaks of the reproduced signal S1 or S2 correspond to the center of each mark. As illustrated by (d) in FIG. 25, the binary MO signal 2511 and the binary ID signal 2512 are generated such that the rising edges thereof coincide with the peak positions that were detected in the reproduced signal S1 or the reproduced signal S2. A synchronizing clock signal is derived from the binary MO signal 2511 or the binary ID signal 2512 in the PLL housed in the data synchronizing section 2504. The synchronized data signal 1410 is generated so as to be synchronized with the above clock signal and, as shown by (e) in FIG. 25, is a binary signal reproducing faithfully the modulated data 1310.

4. Configuration and Operation of the Essential Section of the Present Invention: MO Waveform Processing Section The MO waveform processing section 2502, i.e. the vital section of the present invention will be covered in details hereinbelow. First, the configuration of the MO waveform processing section 2502 will be illustrated schematically.

Figure 2:
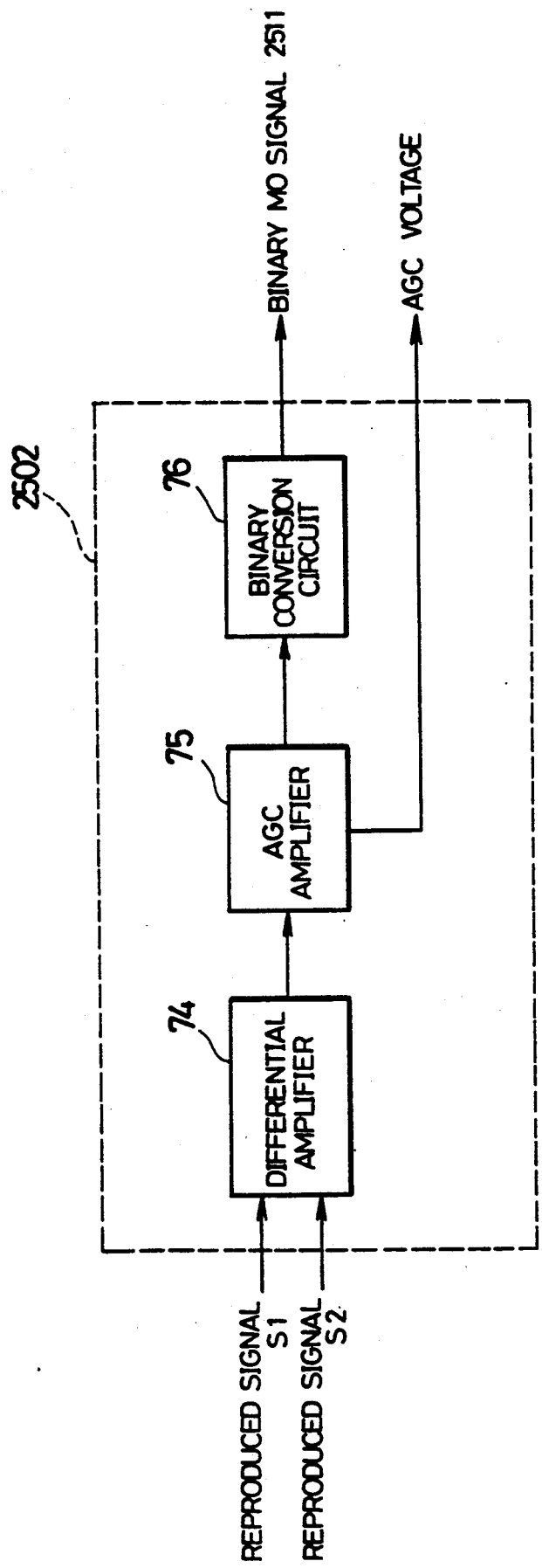

As illustrated in FIG. 2, the MO waveform processing section 2502 comprises a differential amplifier 74, an AGC amplifier 75 serving as AGC circuit (AGC voltage generating means), and a binary conversion circuit 76. The reproduced signals S1 and S2 are fed into the differential amplifier 74 where their difference is determined. As described earlier, the signal derived from the difference of the reproduced signals S1 and S2 (hereinafter referred to as MO data signal), exclusively comprises information recorded in the MO section 3002. The MO data signal is fed into the AGC amplifier 75 where its amplitude is equalized, and is then converted into a binary signal in the binary conversion circuit 76 that releases the binary MO signal 2511 mentioned earlier. The reproduced data is derived from the binary MO signal 2511. Besides, provision is made such that the AGC amplifier 75 emits an AGC voltage to an A/D converter 49 provided in the controller 1208 (see FIG. 1).

4.1 The AGC Amplifier

An example of configuration of the AGC amplifier will be discussed hereinbelow with reference to FIGS. 3 to 5.

Figure 3:
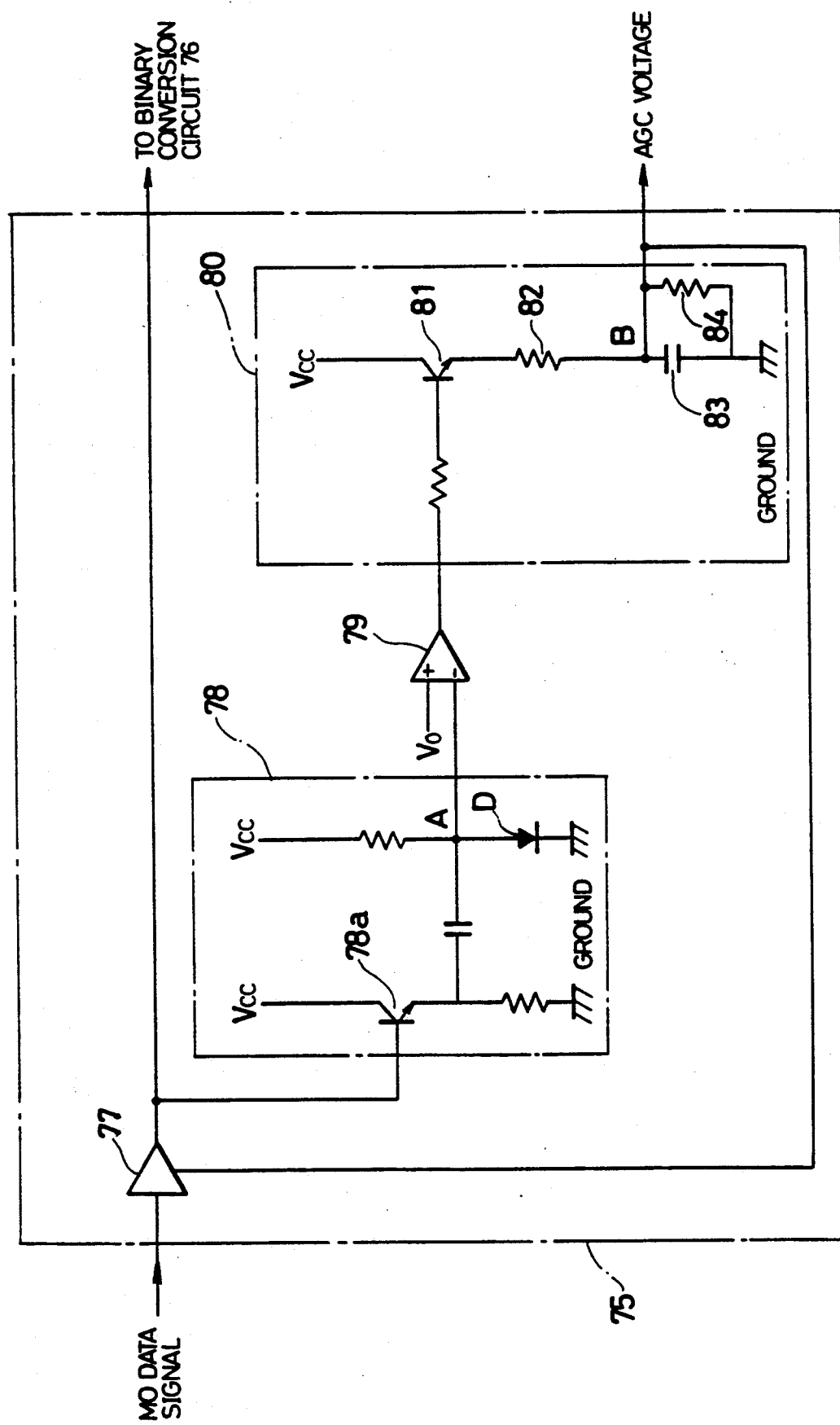
Figure 4:
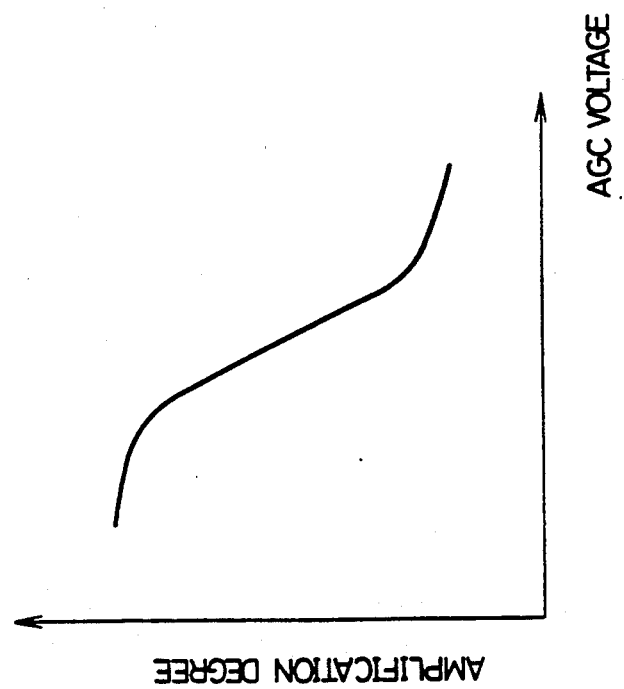

As illustrated in FIG. 3, the AGC amplifier 75 is essentially composed of a clamping circuit 78, a comparator 79, an AGC voltage generating circuit 80, and a voltage controlled amplifier (hereinafter simply referred to as VCA) 77.

The clamping circuit 78 comprises a transistor 78a of the n-p-n type arranged such that its base is connected to the output terminal of the VCA 77, its collector is connected to a D.C. power source Vcc, and its emitter is connected to ground via a resistor. The emitter of the transistor 78a is also connected to an output terminal A of the clamping circuit 78 via a capacitor. The output terminal A is connected to the D.C. power source Vcc via a resistor, as well as to the anode of a diode D whose cathode is connected to ground. In addition, the output terminal A is connected to the inverting input terminal of the comparator 79 whose non-inverting input terminal is connected to a reference voltage Vo.

As to the AGC voltage generating circuit 80, it comprises a transistor 81 of the n-p-n type arranged such that its base is connected to the output terminal of the comparator 79 via a resistor, its collector is connected to the D.C. power source Vcc, and its emitter is connected to ground via a charge resistor 82, a capacitor 83 and a discharge resistor 84. Here, the charge resistor 82 is connected in series with the capacitor 83 and the discharge resistor 84 that are themselves connected in parallel. A node where the charge resistor 82, the capacitor 83 and the discharge resistor 84 are joined, forms the output terminal B of the AGC voltage generating circuit 80. The output terminal B is connected to the VCA 77 so as to form a feedback loop.

The MO data signal, i.e. the output signal released by the differential amplifier 74, is fed into the VCA 77 of the AGC amplifier 75 having the above configuration. The amplification degree of the VCA 77 varies in accordance with the AGC voltage that was fed back from the output terminal B of the AGC voltage generating circuit 80. Namely, as illustrated in FIG. 4, the amplification degree decreases as the AGC voltage increases, and increases as the AGC voltage decreases. The output signal released by the VCA 77 is fed into the binary conversion circuit 76 (shown in FIG. 2) as well as into the base of the transistor 78a accommodated in the clamping circuit 78. In the clamping circuit 78 the D.C. components contained in the output signal of the VCA 77 are cut while the alternating current components (corresponding to the fluctuation from peak to peak) remain. In addition, the positive level of the alternating current components is clamped by means of the diode D accommodated in the clamping circuit 78 at the forward drop voltage of the diode D, while the negative level is transmitted without being clamped to the inverting input terminal of following comparator 79.

In the comparator 79, the amplitude of the clamped signal released by the clamping circuit 78 is compared with the reference voltage Vo applied to the non-inverting input terminal of the comparator 79. Provision is made such that the AGC voltage generating circuit 80 emits the AGC voltage in response to the output signal released by the comparator 79. When, for example, the amplitude of the clamped signal is greater than the reference voltage Vo, the output of the comparator 79 goes in the high level causing the transistor 81 to be turned ON. The capacitor 83 is consequently charged by the power source Vcc via the charge resistor 82 causing the voltage applied to the capacitor 83 to increase. Here, the charge time constant is determined by the values of the charge resistor 82 and the capacitor 83. The AGC voltage generated in the output terminal B, i.e. the voltage between both terminals of the capacitor 83, is transmitted to the VCA 77 where it is employed for regulating the amplification degree and causes the amplification degree of the VCA 77 to decrease.

On the other hand, when the amplitude of the clamped signal is smaller than the reference voltage Vo, the output released by the comparator 79 goes in the low level causing the transistor 81 to be OFF. The electric charge that was accumulated in the capacitor 83 is thus discharged via the discharge resistor 84. Here the discharge time constant is determined by the values of the discharge resistor 84 and the capacitor 83. This causes the AGC voltage to be reduced and thereby the amplification degree of the VCA 77 to increase.

Figure 5:
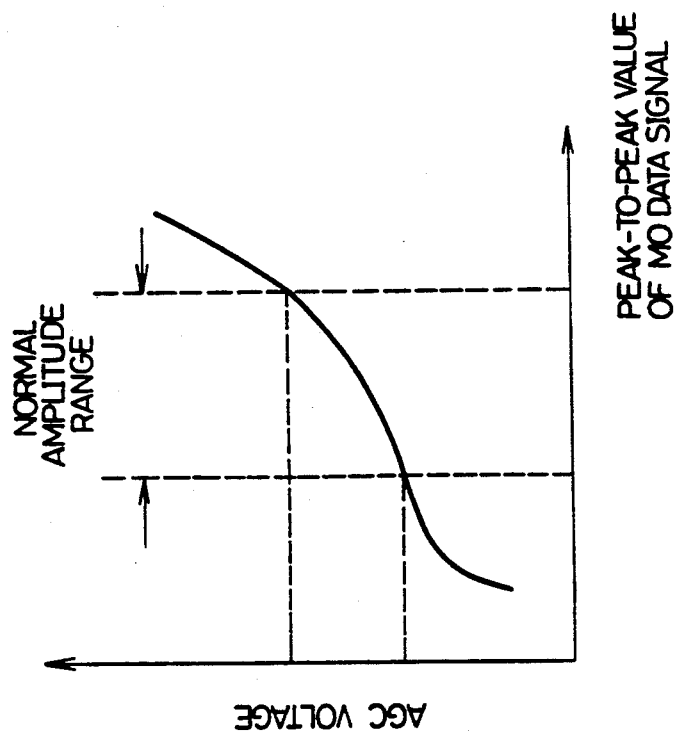

FIG. 5 shows a graph recapitulating the relation of the peak-to-peak value (amplitude) of the MO data signal and the AGC voltage from the above operations. As it can be seen, in the normal amplitude range shown in FIG. 5, the AGC voltage is a nondecreasing function of the peak-to-peak value of MO data signal. That is, the maximal value of the AGC voltage corresponds to the maximal value of the peak-to-peak value of the MO data signal, and the minimal value of the AGC voltage corresponds to the minimal value of peak-to-peak value of the MO data signal. The clamping circuit 78 may also be constituted by a full-wave rectifier circuit.

Figure 6:
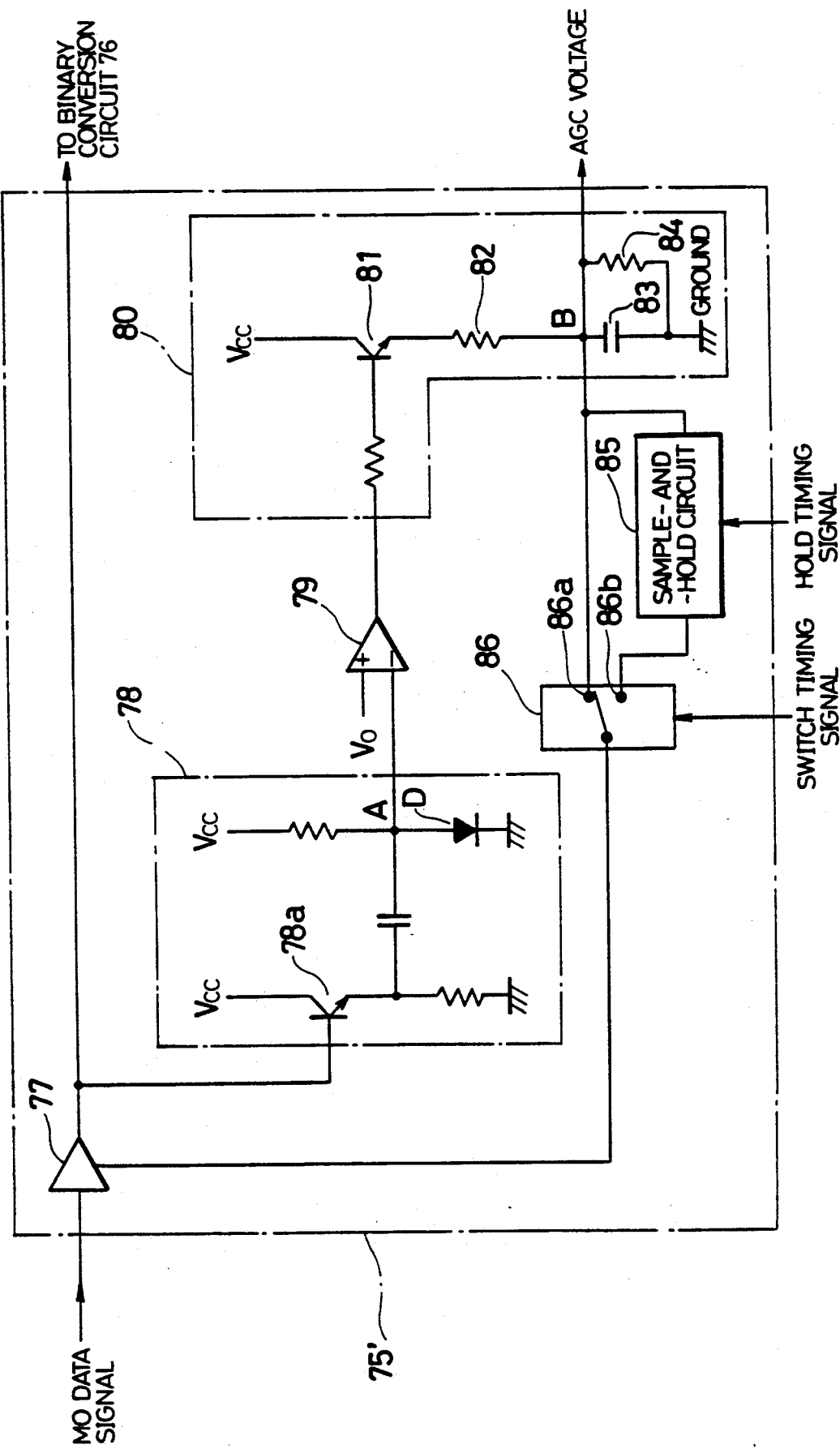
Figure 7:
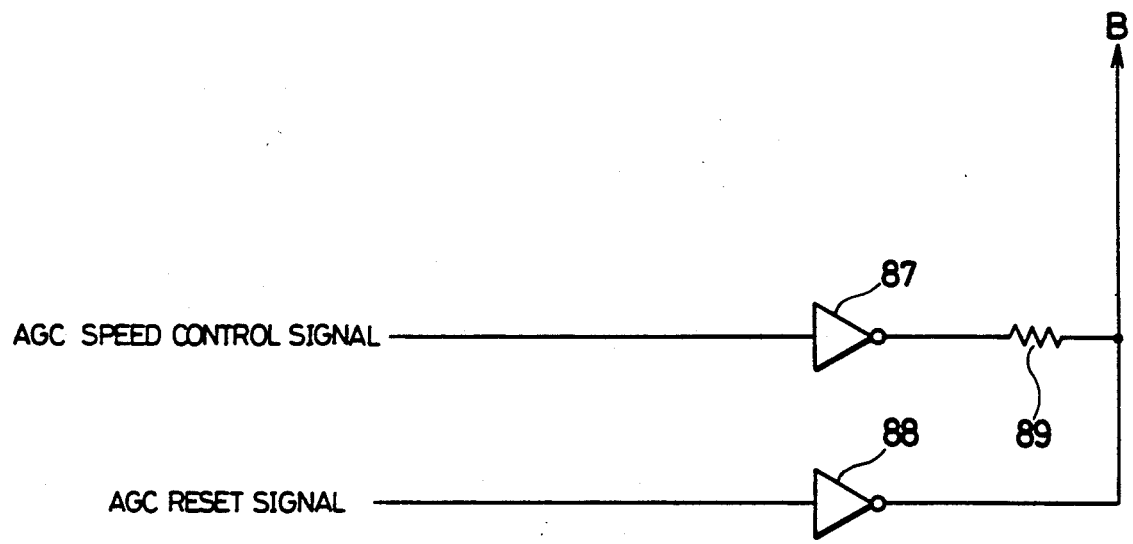

Another example of AGC amplifier 75 will covered hereinbelow with reference to FIG. 6. For convenience sake, the members having the same function than in the amplifier 75 discussed above, will be designated by the same code and their description will be omitted.

An AGC amplifier 75' chosen as example has a configuration similar to that of the AGC amplifier 75 except for the fact that the AGC voltage is fed back to the VCA 77 via a sample-and-hold circuit 85 and an analog switch 86. The sample-and-hold circuit 85 and the analog switch 86 are provided in order to hold the AGC voltage at the value preceding the start of the recording/erasing operations during the recording/erasing operations. Namely, during the reproduction operation, the AGC voltage does not pass through the sample-and-hold circuit 85 but is transmitted directly to the VCA 77 through a junction point 86a of the analog switch 86. On the other hand, during the recording/erasing operations, a switch timing signal is fed into the analog switch 86 causing the junction point 86a to be changed over to a junction point 86b, while a hold timing signal is fed into the sample-and-hold circuit 85. The AGC voltage is thus maintained to the AGC voltage value preceding the start of the recording/erasing operations. As a result, when a reproduction operation starts following recording/erasing operations, the AGC voltage that was not affected by the recording/erasing operations and remained constant is supplied to the VCA 77. This allows the reproduction operation to be started accurately thereby improving the reliability of the magneto-optical disk device. The sample-and-hold circuit 85 may also comprise an A/D converter and a D/A converter.

4.2 Shortening of the Response Time of the AGC Amplifier

However, the response of the AGC amplifier 75 or 75' has to be fast so that the characteristics of the magneto-optical disk being loaded can be recognized quickly when the system (i.e. the optical recording/reproducing device) is started. A circuit permitting to reduce the time constant during the discharge of the capacitor 83 housed in the AGC voltage generating circuit 80, and to improve the response time of the AGC amplifier 75 or 75' will be described hereinbelow with reference to FIG. 7.

This circuit is essentially composed of open collectors 87 and 88 and a discharge resistor 89. The output of the open collector 88 is connected to the output terminal B of the AGC voltage generating circuit 80 shown in FIG. 3 (or FIG. 6). Provision is made such that, for example, an AGC speed control signal is fed into the open collector 87, and an AGC reset signal is fed into the open collector 88. The AGC speed control signal is in the high level while the characteristics of the magneto-optical disk are determined. At this time, the discharge resistor 89 is connected in parallel with the discharge resistor 84 shown in FIG. 3 (or FIG. 6) simultaneously with the change of the output released by the open collector 87 to the low level. Such an arrangement permits to reduce the time needed for the discharge of the capacitor 83. As to the AGC reset signal, it changes to the high level when the system is started or when an abnormality occurred in the system. The discharge resistor 84 is then short-circuited permitting the discharge to be achieved instantaneously.

The above arrangement thus permits to shorten the response time of the AGC amplifier 75 or 75'.

4.3 Determination of the Magneto-Optical Disk Characteristics through the AGC Voltage The arrangement made and the operations performed for determining the characteristics of the magneto-optical disk will be discussed hereinbelow.

FIG. 1 shows essential parts of the present invention comprised in the controller 1208. The AGC voltage, i.e. the output released by the AGC amplifier 75 or 75' is fed into an A/D converter 49 housed in the controller 1208 where it is converted into a digital value. The AGC voltage after being translated into a digital value, is then transmitted to a processor 70 serving as control means where it is sampled. The processor 70 determines whether the AGC voltage that was sampled is comprised within the permissible range previously set for the reproduction operation or for recording/erasing operations. A window comparator may also be used instead of the A/D converter 49.

Figure 8:
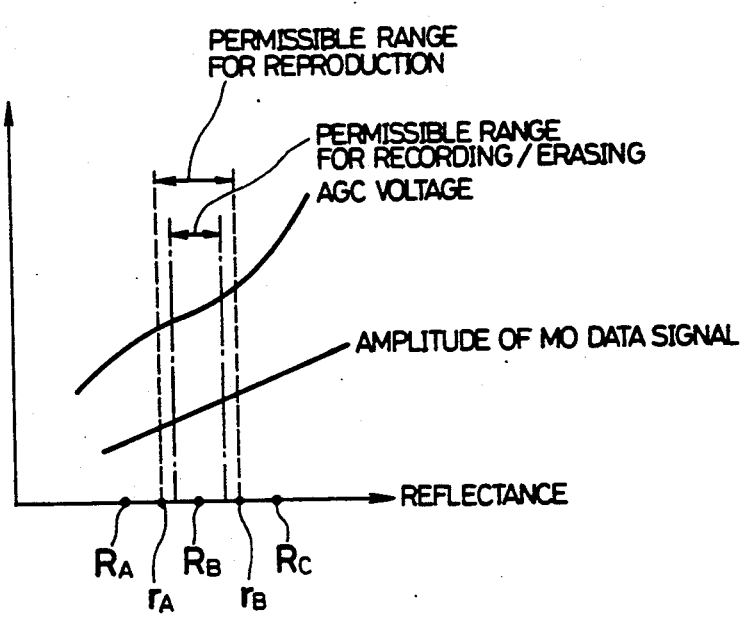

Usually, when the reflectance of the magneto-optical disk changes, the amplitude of the reproduced signals changes also. This causes the AGC voltage (or the amplitude of the MO data) to vary as shown in FIG. 8. Namely, the AGC voltage (or the amplitude of the MO data signal) increases as a non-decreasing function of the reflectance. Therefore, the reflectance of the magneto-optical disk being loaded may be determined through the value of the AGC voltage (or the amplitude of the MO data signal). Suppose now that magneto-optical disks A, B and C are to be used with the magneto-optical disk device of the present invention and have reflectances $R_A$, $R_B$ and $R_C$ respectively (where $R_A < R_B < R_C$) while the previously set permissible range of the reflectance for reproduction $r_A$ to $r_B$ is as shown by the broken lines in FIG. 8 (i.e. $R_A < r_A < R_B < r_B < R_C$). Here, the reflectance $R_B$ falls within the permissible range for reproduction. The present magneto-optical disk device may be thus adopted for reading and recording/erasing information on the magneto-optical disk B. On the other hand, when the magneto-optical disks A and C are loaded in the magneto-optical disk device, the processor 70 orders their ejection and generates an alarm display output signal as the reflectance $R_A$ and $R_C$ do not fall within the permissible range for reproduction.

As time goes by, the recording marks gradually deteriorate sometimes causing the amplitude of the reproduced signals to decrease. Here, the deterioration degree of the recording marks can be detected through the AGC voltage, as the AGC decreases in function of the decrease in the amplitude of the reproduced signals. Accordingly, the magneto-optical disk device can be designed if desired such that re-writing or other measures to be taken are displayed before the recording marks become impossible to read.

In some instances, such as shown in FIG. 8, the permissible range for reproduction and the permissible range for recording/erasing do not coincide. This happens when, for example, a magneto-optical disk having a reflectance such that the light intensity needed for recording/erasing exceeds the maximum light intensity the semiconductor laser is able to emit, is loaded in the magneto-optical device. For magneto-optical disks having such a reflectance, the light intensity needed for the reproduction of information can be emitted, but the light intensity needed for recording/erasing cannot. Consequently, with such optical disks the permissible range for recording/erasing must be narrower than the permissible range for reproduction. The same phenomenon occurs when the magnitude of the external magnetic field has a maximum limit. In such a case, provision can be made such that the magneto-optical disk device only executes reproduction operations, and such that any recording/erasing operation is prohibited. The magneto-optical disk device may also be designed such as to report to an external device or such as to display that only reproduction operations can be performed on the magneto-optical disk being loaded.

Figure 9:
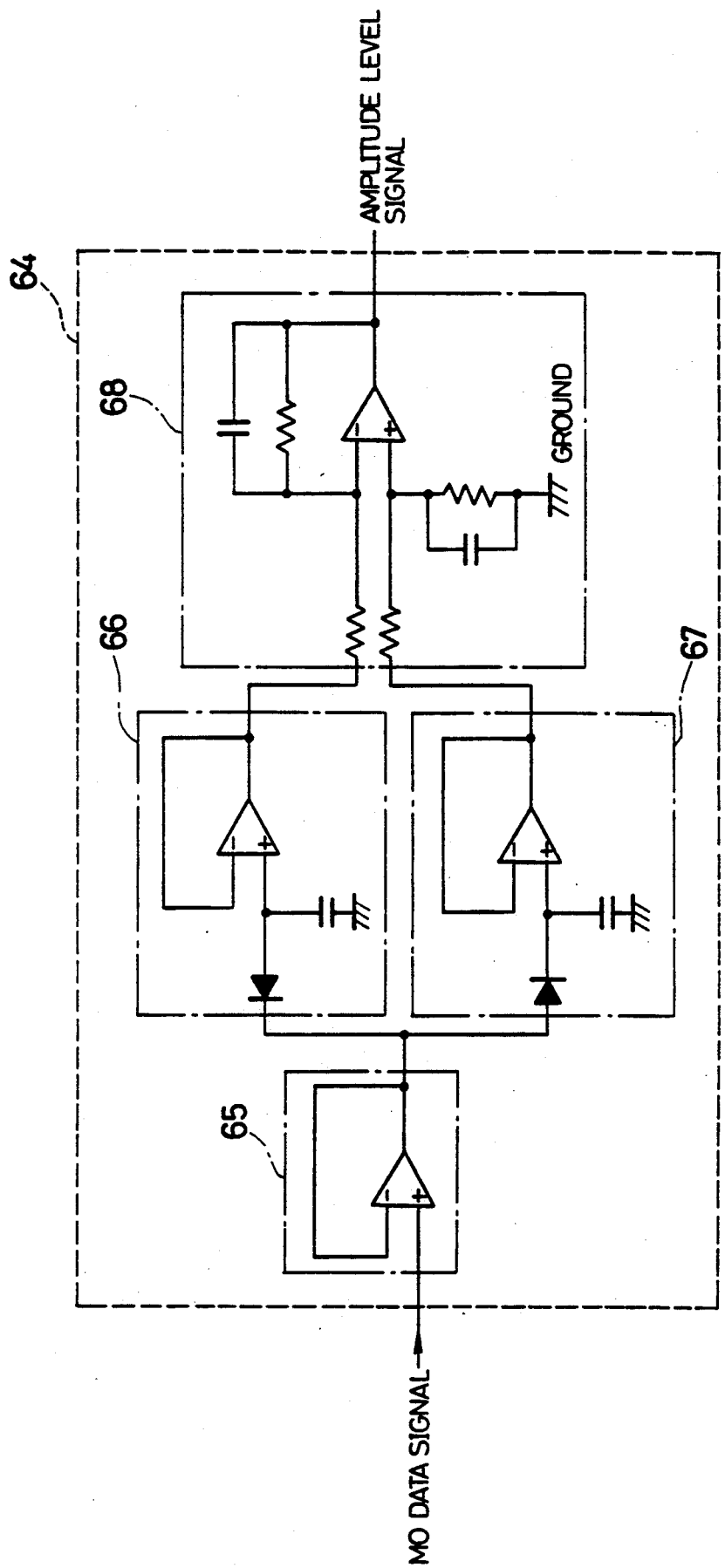

4.4 Determination of the Magneto-Optical Disk Characteristics through the Amplitude of the MO Data Signal The characteristics of the magneto-optical disk can be determined through the amplitude of the MO data signal which, like the AGC voltage, increases as a non-decreasing function of the reflectance, as illustrated in FIG. 8. In this case, an envelope detection circuit 64 such as shown in FIG. 9, can be adopted as means for detecting the amplitude of the MO data signal. However, when compared to the method making use of the AGC voltage, the above method presents the disadvantage that it requires a separate circuit.

The envelope detection circuit 64 is essentially composed of a buffer circuit 65, a first sample-and-hold circuit 66, a second sample-and-hold circuit 67 and a differential amplification circuit 68. The MO data signal is fed through the buffer circuit 65 to the first and second sample-and-hold circuits 66 and 67 that release outputs remaining constant at values respectively corresponding to the upper peak value and the lower peak value of the MO data signal. The differential amplification circuit 68 releases an amplitude level signal based on the constant values released by the first and second sample-and-hold circuits 66 and 67. The characteristics of the magneto-optical disk can be determined by detecting whether this amplitude level signal falls within a preliminary set range.

The magneto-optical disk device may also be designed for embodiments other than the one described above. The magneto-optical disk device may be for instance designed such that the operating conditions for reproduction and for recording/erasing, such as the light intensity for reproduction, light intensity for recording/erasing, length of the recording pulse, external magnetic field, etc. are automatically adjusted to the characteristics of the disk being loaded therein according to the value of the AGC voltage. The operating conditions for recording/erasing will be taken as an example. The higher the reflectance of the disk is, the lower the recording/erasing sensibility is. Therefore, a disk having a high reflectance requires a laser beam of a great light intensity, a laser driving pulse of a long pulse length, or a strong magnetic field. Recording/erasing operations on a disk having a high reflectance can be thus adequately executed by modifying the above conditions in response to the AGC voltage. Of course, the operating conditions for recording/erasing may be modified in response to the amplitude level signal released by the envelope detection circuit 64 described earlier instead of the AGC voltage.

As described above, when it is determined in the processor 70 that the AGC voltage (or the amplitude of the amplitude level signal) that went through a sampling process, falls within the permissible range for reproduction or the permissible range for recording/erasing, the operations permitting to read, record or erase information on the disk are executed. Meanwhile, when it is determined that the AGC voltage (or the amplitude of the amplitude level signal) is not comprised within the permissible range for reproduction or within the permissible range for recording/erasing, the processor 70 orders the ejection of the disk and generates an appropriate alarm display output signal. The magneto-optical disk device may be arrange so as to inform the operator that the AGC voltage is not comprised within the permissible range for reproduction or the permissible range for recording/erasing. For instance, the alarm display signal may be used for making an alarm ring, an alarm lamp blink or the like.

The case where information is read, recorded or erased with the sam magneto-optical disk device on two types of disks having different characteristics, such as for example a Read-Only ROM type disk and a Re-Writable/Erasable magneto-optical disk, can be cited as an example where the operating conditions for reproduction, recording or erasing need to be set in accordance with the characteristics of the disk. The two types of disks may be for example a CD (compact disk) and an Erasable CD whereon information can be magneto-optically recorded/erased. These two types of disks usually have significantly different reflectances. Here, the characteristics of the two different disks may be determined through the AGC voltage, and the magneto-optical disk device may be arranged such as to inform an external device or to display that disks of different characteristics have been loaded, or further, such as to modify the intensity of the light emitted by the semiconductor laser. The magneto-optical disk device may also be arranged such that the amplitude of the output signal released by the photodetector is made to fall within the operational range of the following circuit by switching between a plurality of attenuators or amplifiers.

In the above embodiments, data recorded in the preformatted section 3003 or MO section 3002 was read by determining the sum or difference of two reproduced signals S1 and S2. However, such an arrangement is not a requisite feature of the present invention. Furthermore, in the above embodiments, the track 1205 of the magneto-optical disk 1201 was constituted of a plurality of sectors 3004, each sector 3004 being composed of a pre-formatted section 3003 and a MO section 3002. However the present invention may also be adopted for reproducing information that was recorded on a magneto-optical disk with a format different from the above format. Moreover, the present invention may be adopted for reading information recorded not only on magneto-optical disks, but also on Re-writable optical disks such as phase transition type optical disks, or Direct Read After Write type optical disks whereon desired information can be recorded only once, as well as for reading information recorded on information recording mediums other than optical disks.

As described above, the optical recording/reproducing device in accordance with the present invention comprises AGC voltage generating mean for emitting an AGC voltage employed for controlling the amplification of a reproduced signal in response to the amplitude of the reproduced signal, and control means for preliminary setting permissible ranges for the AGC voltage value for recording operation, for erasing operation and for reproduction operation; for comparing the AGC voltage with the permissible range corresponding to the instructed operation when an optical recording medium is loaded in the device and when one of the recording operation, erasing operation and reproduction operation is instructed; and for setting the conditions of the instructed operation for each optical recording medium.

Accordingly, even if the device employed is different, or even if optical recording mediums having different characteristics (for instance, different reflectances or transmittances) are used, the above arrangement permits to avoid that a laser light of an intensity inadequate for reproduction which might erase the information recorded, is projected on the optical recording medium, and permits to protect the optical recording medium from destruction. The above arrangement thus permits to improve the reliability of the entire device through the implementation of a simple and inexpensive circuitry.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An optical recording/reproducing device comprising:

AGC voltage generating means for emitting an AGC voltage employed for controlling an amplification of a reproduced signal derived from a reflected light from an optical recording medium, in accordance with the amplitude of said reproduced signal; and control means for:

(i) preliminary setting permissible ranges for the value of said AGC voltage for recording operation, for erasing operation and for reproduction operation, (ii) determining, when an optical recording medium is loaded in said optical recording/reproducing device and when one of the recording operation, erasing operation or reproduction operation is instructed, whether the AGC voltage emitted by said AGC voltage generating means falls within the permissible range among said permissible ranges corresponding to the instructed operation, (iii) enabling the instructed operation to be executed by said optical recording/reproducing device when the AGC voltage is comprised within said corresponding permissible range, (iv) having said optical recording medium ejected when the AGC voltage does not fall within said corresponding permissible range.

2. An optical recording/reproducing device as defined in claim 1, wherein said control means comprises:
an A/D converter where the AGC voltage emitted by said AGC voltage generating means is fed to, and that converts the value of the AGC voltage into a digital value; and
a processor where said digital value is sampled, that determines whether the AGC voltage is comprised within said permissible range corresponding to the instructed operation based on said sampled digital value, that enables the instructed operation to be executed by said optical recording/reproducing device when the AGC voltage is comprised within said corresponding permissible range, that ejects said optical recording medium when the AGC voltage does not fall within said corresponding permissible range, that generates an alarm display output signal indicating that the instructed operation is not feasible, and that sets conditions of the instructed operation in said optical recording/reproducing device for each optical recording medium that is loaded after comparing the AGC voltage and said permissible range corresponding to the instructed operation.

3. An optical recording/reproducing device as defined in claim 1, wherein said AGC voltage generating means comprises:
a voltage controlled amplifier where said reproduced signal and said AGC voltage are fed to, and arranged such that the amplification degree for said reproduced signal decreases as said AGC voltage value increases;
a clamping circuit where an output signal released by said voltage controlled amplifier is fed to, where an upper limit level or a lower limit level of alternating current components contained in said output signal is clamped, and that generates a clamped signal;
a comparator where the amplitude of said clamped signal released by said clamping circuit is compared with a reference voltage; and
an AGC voltage generating circuit for emitting said AGC voltage in response to an output released by said comparator.

4. An optical recording/reproducing device as defined in claim 3, wherein said AGC voltage generating means further comprises:
a sample-and-hold circuit where said AGC voltage emitted by said AGC voltage generating circuit is fed to, and that, during recording and during erasing, holds said AGC voltage value at said AGC voltage value preceding the start of recording or the start of erasing; and
an analog switch for changing over such that during reproduction, said AGC voltage is sent to said voltage controlled amplifier from said AGC voltage generating circuit, and such that during recording or erasing, said AGC voltage that was held in said sample-and-hold circuit is sent to said voltage controlled amplifier from said sample-and-hold circuit.

5. An optical recording/reproducing device as defined in claim 3, wherein said clamping circuit comprises:

an n-p-n type transistor whose base is connected with an output terminal of said voltage controlled amplifier, whose collector is connected to a D.C. power source Vcc and whose emitter is connected to ground via a resistor;
a diode whose cathode is connected to ground and whose anode is connected to a D.C. power source Vcc via a resistor; and
a capacitor having one end connected to the emitter of said transistor, and having another end connected to the anode of said diode,
a junction point where the anode of said diode and said capacitor are connected, serving as output terminal of said clamping circuit, and
the alternating current components contained in the output signal released by said voltage controlled amplifier being clamped at a forward voltage drop value of said diode.

6. An optical recording/reproducing device as defined in claim 3, wherein:
said AGC voltage generating circuit comprises an n-p-n type transistor whose base is connected to an output terminal of said comparator via a resistor, whose collector is connected to a D.C. power source Vcc, and whose emitter is connected to ground via a charge resistor, a capacitor and a first discharge resistor;
said charge resistor being connected in series with said capacitor and said first discharge resistor, wherein said capacitor and said first discharge resistor are connected in parallel; and
said AGC voltage being released from a node where said charge resistor, said capacitor and said first discharge resistor are connected.

7. An optical recording/reproducing device as defined in claim 6 wherein said AGC voltage generating means further comprises:
a first open collector where an AGC speed control signal is fed to, said AGC speed control signal being in a high level while characteristics of the optical recording medium loaded in said optical recording/reproducing device are determined by said control means; and
a second open collector where an AGC reset signal is fed to, said AGC reset signal being in a high level when said optical recording/reproducing device is started or when an abnormality occurred,
wherein an output terminal of said first open collector is connected to said node of said AGC voltage generating circuit via a second discharge resistor, and an output terminal of said second open collector is also connected to said node, and
the response of said AGC voltage generating means is speeded by reducing a discharge time constant of said capacitor.

8. An optical recording/reproducing device as defined in claim 1 further comprising reproduced signal amplitude detecting means for detecting the amplitude of said reproduced signal and generating an amplitude level signal, and wherein said control means:
(i) preliminary sets permissible ranges for the amplitude of said reproduced signal for recording operation, for erasing operation, and for reproduction operation;
(ii) determines, when an optical recording medium is loaded in said device and when one of the recording operation, erasing operation or reproduction operation is instructed, whether the amplitude of said reproduced signal falls within the permissible range among said permissible ranges corresponding to the instructed operation based on the amplitude level signal detected by said reproduced signal amplitude detecting means;

(iii) enables the instructed operation to be executed by said optical recording/reproducing device when the amplitude of said reproduced signal is comprised within said corresponding permissible range;

(iv) has said optical recording medium ejected when the amplitude does not fall within said corresponding permissible range.

9. An optical recording/reproducing device as defined in claim 8, wherein said reproduced signal amplitude detecting means comprises:

a buffer circuit;

a first sample-and-hold circuit where said reproduced signal is fed to through said buffer circuit, and that generates and releases a signal maintained constant at an upper peak value of said reproduced signal;

a second sample-and-hold circuit where said reproduced signal is fed to through said buffer circuit, and that generates and releases a signal maintained constant at a lower peak value of said reproduced signal; and a differential amplification circuit where the signal released by said first sample-and-hold circuit and the signal released by said second sample-and-hold circuit are fed to, and that generates and releases an amplitude level signal corresponding to a peak-to-peak value of said reproduced signal.

10. An optical recording/reproducing device as defined in claim 1, wherein said control means further:

generates an alarm display output signal indicating that the instructed operation is not feasible; and sets conditions of the instructed operation in said optical recording/reproducing device for each optical recording medium that is loaded after comparing the AGC voltage and said permissible range corresponding to the instructed operation.

11. An optical recording/reproducing device as defined in claim 8, wherein said control means further:

generates an alarm display output signal indicating that the instructed operation is not feasible; and sets conditions of the instructed operation in said optical recording/reproducing device for each optical recording medium that is loaded after comparing said amplitude and said permissible range corresponding to the instructed operation.

* * * * *